(12) United States Patent  
Kamada et al.

(10) Patent No.: US 8,166,405 B2  
(45) Date of Patent: Apr. 24, 2012

(54) INFORMATION PROCESSING APPARATUS, DISPLAY DATA PROVIDING METHOD AND PROGRAM

(75) Inventors: Yasunori Kamada, Kanagawa (JP); Takayasu Kon, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 12/364,711

(22) Filed: Feb. 3, 2009

(65) Prior Publication Data

US 2009/0199105 A1 Aug. 6, 2009

(30) Foreign Application Priority Data

Feb. 6, 2008 (JP) ................................. 2008-026700

(51) Int. Cl.
*G06F 3/00* (2006.01)
*G06F 3/048* (2006.01)
(52) U.S. Cl. ......... 715/738; 715/745; 715/789; 715/811
(58) Field of Classification Search .................. 715/738, 715/745, 789, 811
See application file for complete search history.

(56) References Cited

U.S. PATENT DOCUMENTS

| | | | |
|---|---|---|---|
| 5,585,220 A | 12/1996 | Breyta et al. | |
| 6,976,229 B1 * | 12/2005 | Balabanovic et al. | 715/838 |
| 7,299,255 B2 * | 11/2007 | Tenorio | 709/201 |
| 7,634,733 B2 * | 12/2009 | Sadikali et al. | 715/738 |
| 7,735,018 B2 * | 6/2010 | Bakhash | 715/782 |
| 7,962,843 B2 * | 6/2011 | Milic-Frayling et al. | 715/206 |
| 2003/0236625 A1 * | 12/2003 | Brown et al. | 702/2 |
| 2005/0283741 A1 * | 12/2005 | Balabanovic et al. | 715/838 |
| 2006/0016877 A1 | 1/2006 | Bonalle et al. | |
| 2007/0011616 A1 * | 1/2007 | Ording et al. | 715/738 |
| 2008/0168085 A1 * | 7/2008 | Chun et al. | 707/102 |
| 2008/0170152 A1 * | 7/2008 | Fujii | 348/345 |
| 2009/0152344 A1 | 6/2009 | Kamada et al. | |
| 2009/0157298 A1 | 6/2009 | Kon et al. | |
| 2009/0187597 A1 | 7/2009 | Kamada et al. | |
| 2009/0240688 A1 * | 9/2009 | Ohwa et al. | 707/5 |
| 2010/0257094 A1 * | 10/2010 | Kumar et al. | 705/40 |
| 2011/0016402 A1 * | 1/2011 | Dailey | 715/738 |

FOREIGN PATENT DOCUMENTS

| | | |
|---|---|---|
| GB | 2301207 A | 11/1996 |
| GB | 2333838 A | 8/1999 |
| JP | 54-156600 A | 12/1979 |
| JP | 58-027509 A | 2/1983 |
| JP | 07-036657 A | 2/1995 |

(Continued)

*Primary Examiner* — Weilun Lo
*Assistant Examiner* — Shashi Becker
(74) *Attorney, Agent, or Firm* — Wolf, Greenfield & Sacks, P.C.

(57) ABSTRACT

There is provided an information processing apparatus, including a storage part storing, user by user, history information, an evaluation processing part deriving, user by user, an evaluation index value corresponding to an evaluation theme requested in a display request transmitted from a display apparatus, by performing a process according to the evaluation theme for each piece of history information of at least two users who are requested to be displayed in the display request, a relative processing part deriving user by user a relative evaluation parameter showing relationship between the users in the evaluation theme based on the evaluation index value, and a display data generation part generating display data which shows an evaluation image of each user showing the relationship between the users in the evaluation theme, by generating user by user the evaluation image based on the relative evaluation parameter.

5 Claims, 32 Drawing Sheets

FOREIGN PATENT DOCUMENTS

| | | |
|---|---|---|
| JP | 09-091352 A | 4/1997 |
| JP | 09-251502 A | 9/1997 |
| JP | 11-076620 A | 3/1999 |
| JP | 2000-242717 A | 9/2000 |
| JP | 2000-306162 A | 11/2000 |
| JP | 3127443 B2 | 11/2000 |
| JP | 2001-147132 A | 5/2001 |
| JP | 2001-174273 A | 6/2001 |
| JP | 2001-252481 A | 9/2001 |
| JP | 2002-098537 A | 4/2002 |
| JP | 2002-278993 A | 9/2002 |
| JP | 2002-350153 A | 12/2002 |
| JP | 2002-366862 A | 12/2002 |
| JP | 2003-030449 A | 1/2003 |
| JP | 2003-288515 A | 10/2003 |
| JP | 2003-302240 A | 10/2003 |
| JP | 2003-308434 A | 10/2003 |
| JP | 2004-005502 A | 1/2004 |
| JP | 2004-077335 A | 3/2004 |
| JP | 2004-102381 A | 4/2004 |
| JP | 2004-193995 A | 7/2004 |
| JP | 2005-144191 A | 6/2005 |
| JP | 2006-110340 | 4/2006 |
| JP | 2006-170814 A | 6/2006 |
| JP | 2006-301955 A | 11/2006 |
| JP | 2007-233491 A | 9/2007 |
| JP | 2007-257168 A | 10/2007 |
| JP | 2007-269268 A | 10/2007 |
| JP | 2007-316857 A | 12/2007 |
| KR | 20010044437 A | 6/2001 |
| WO | WO 2005/010267 A | 2/2005 |

* cited by examiner

FIG.2

| TIME (n) | BANK ACCOUNT (Ga) | | BUYING HISTORY (Ka) | SECURITIES TRADING (Sa) | |
|---|---|---|---|---|---|
| | BALANCE (B) | DEPOSIT (C) | EXPENDITURE (D) | BALANCE (E) | PROFIT AND LOSS (F) |
| 1 | 200 | 30 | 28 | 100 | -20 |
| 2 | 202 | 35 | 21 | 80 | 30 |
| 3 | 216 | 28 | 23 | 110 | -15 |
| 4 | 221 | 31 | 25 | 95 | 15 |
| 5 | 227 | 28 | 38 | 110 | 3 |
| 6 | 217 | 35 | 28 | 113 | -2 |
| 7 | 224 | 30 | 21 | 111 | -3 |
| 8 | 233 | 31 | 20 | 108 | -5 |
| 9 | 244 | 30 | 28 | 103 | 18 |
| 10 | 246 | 30 | 29 | 121 | -8 |
| 11 | 247 | 31 | 28 | 113 | 30 |
| 12 (CURRENT) | 250 | 35 | 31 | 143 | 18 |

FIG.3

| ASSET MANAGEMENT EVALUATION INDEX | EVALUATION CONTENT |
|---|---|
| ASSET BALANCE INDEX (L) | INDEX TO EVALUATE USER'S CURRENT ASSETS |
| ASSET FLUCTUATION INDEX (M) | INDEX TO EVALUATE WHETHER ASSETS ARE ON UPWARD TREND OR DOWNWARD TREND |
| ASSET VARIABILITY INDEX (N) | INDEX TO EVALUATE WHETHER ASSETS ARE STABLE |
| SECURITIES CONSTITUTION INDEX (O) | INDEX TO EVALUATE ASSET CONSTITUTION CONTENT |

FIG.4

| TIME (n) | ASSET BALANCE (I)<br>I=B+E | APPROXIMATE ERROR (h)<br>h=I-f(n) | SECURITIES CONSTITUTION (o)<br>o=E/I(%) |
|---|---|---|---|
| 1 | 300 | 5.8 | 33.3% |
| 2 | 282 | -19.8 | 28.4% |
| 3 | 326 | 16.6 | 33.7% |
| 4 | 316 | -1.1 | 30.1% |
| 5 | 337 | 12.3 | 32.6% |
| 6 | 330 | -2.3 | 34.2% |
| 7 | 335 | -5.0 | 33.1% |
| 8 | 341 | -6.6 | 31.7% |
| 9 | 347 | -8.3 | 29.7% |
| 10 | 367 | 4.1 | 33.0% |
| 11 | 360 | -10.5 | 31.4% |
| 12 | 393 | 14.8 | 36.4% |

FIG.7

| ASSET MANAGEMENT EVALUATION INDEX | INDEX VALUE |
|---|---|
| ASSET BALANCE INDEX (L) | 393 |
| ASSET FLUCTUATION INDEX (M) | 7.6 |
| ASSET VARIABILITY INDEX (N) | 11.0 |
| SECURITIES CONSTITUTION INDEX (O) | 32.3 |

FIG.8A

| ASSET MANAGEMENT EVALUATION INDEX | INDEX VALUE |
|---|---|
| ASSET BALANCE INDEX (La) | 393 |
| ASSET FLUCTUATION INDEX (Ma) | 7.6 |
| ASSET VARIABILITY INDEX (Na) | 11.0 |
| SECURITIES CONSTITUTION INDEX (Oa) | 32.3 |

FIG.8B

| ASSET MANAGEMENT EVALUATION INDEX | INDEX VALUE |
|---|---|
| ASSET BALANCE INDEX (Lb) | 397 |
| ASSET FLUCTUATION INDEX (Mb) | -0.3 |
| ASSET VARIABILITY INDEX (Nb) | 3.8 |
| SECURITIES CONSTITUTION INDEX (Ob) | 36.9 |

FIG.8C

| ASSET MANAGEMENT EVALUATION INDEX | INDEX VALUE |
|---|---|
| ASSET BALANCE INDEX (Lc) | 398 |
| ASSET FLUCTUATION INDEX (Mc) | -11.8 |
| ASSET VARIABILITY INDEX (Nc) | 58.3 |
| SECURITIES CONSTITUTION INDEX (Oc) | 76.4 |

FIG.10

| ASSET MANAGEMENT RELATIVE PARAMETER | USER A | | USER B | | USER C | | AVERAGE VALUE | |
|---|---|---|---|---|---|---|---|---|
| ASSET BALANCE RELATIVE PARAMETER (W) | POSITIVE | 0 | POSITIVE | 80 | POSITIVE | 100 | POSITIVE | 60 |
| ASSET FLUCTUATION RELATIVE PARAMETER (X) | POSITIVE | 9.1 | NEGATIVE | 1.2 | NEGATIVE | -10.3 | - | |
| ASSET VARIABILITY RELATIVE PARAMETER (Y) | 0.5 | | 0.2 | | 2.4 | | - | |
| SECURITIES CONSTITUTION RELATIVE PARAMETER (Z) | 0.7 | | 0.8 | | 1.2 | | - | |

FIG.18

| EXERCISE AMOUNT EVALUATION INDEX | EVALUATION CONTENT |
|---|---|
| EXERCISE AMOUNT EQUALIZATION INDEX (N) | INDEX TO EVALUATE USER'S EXERCISE AMOUNT |
| EXERCISE AMOUNT DISPERSION INDEX (O) | INDEX TO EVALUATE TEMPORAL DISPERSION OF USER'S EXERCISE AMOUNT |

FIG.19

| BEHAVIOR TYPE | TIME (MIN) |
|---|---:|
| SLEEP | 420 |
| REST (SITTING) | 60 |
| WALKING (60 M/MIN) | 30 |
| WALKING (90 M/MIN) | 10 |
| DESK WORK | 360 |
| EAT | 60 |
| BATH | 20 |
| ⋮ | ⋮ |
| SWIMMING (LIGHTLY) | 30 |
| DUMBBELL EXERCISE | 20 |
| ⋮ | ⋮ |

FIG.20A

| AGE | MAN | WOMAN |
|---|---|---|
| 20~ | 0.0170 | 0.0163 |
| 30~ | 0.0163 | 0.0153 |
| 40~ | 0.0160 | 0.0149 |
| 50~ | 0.0160 | 0.0146 |

FIG.20B

| AGE | MAN | WOMAN |
|---|---|---|
| 20~ | 1.00 | 1.00 |
| 30~ | 0.95 | 0.94 |
| 40~ | 0.93 | 0.91 |
| 50~ | 0.92 | 0.89 |

FIG.20C

| BEHAVIOR TYPE | RMR |
|---|---|
| EAT | 0.4 |
| WALKING (60 M/MIN) | 1.9 |
| WALKING (90 M/MIN) | 4.0 |
| CYCLING | 2.6 |
| BATH | 2.3 |
| DESK WORK | 0.6 |
| READING/TV WATCHING ETC. | 0.2 |
| ⋮ | ⋮ |

FIG.21

| TIME (DAY) | TOTAL METABOLIC RATE IN SEVEN DAYS |
|---|---|
| | TOTAL METABOLIC RATE (Kcal) |
| 1 | 1530 |
| 2 | 1680 |
| 3 | 1890 |
| 4 | 1500 |
| 5 | 1650 |
| 6 | 1720 |
| 7 | 1750 |

FIG.23

| EVALUATION INDEX OF USER A | |
|---|---|
| EXERCISE AMOUNT EVALUATION INDEX | INDEX VALUE |
| EXERCISE AMOUNT EQUALIZATION INDEX (Na) | 1634 |
| EXERCISE AMOUNT DISPERSION INDEX (Oa) | 84 |

FIG.24A

| EVALUATION INDEX OF USER A | |
|---|---|
| EXERCISE AMOUNT EVALUATION INDEX | INDEX VALUE |
| EXERCISE AMOUNT EQUALIZATION INDEX (Na) | 1634 |
| EXERCISE AMOUNT DISPERSION INDEX (Oa) | 84 |

FIG.24B

| EVALUATION INDEX OF USER B | |
|---|---|
| EXERCISE AMOUNT EVALUATION INDEX | INDEX VALUE |
| EXERCISE AMOUNT EQUALIZATION INDEX (Nb) | 1616 |
| EXERCISE AMOUNT DISPERSION INDEX (Oc) | 227 |

FIG.24C

| EVALUATION INDEX OF USER C | |
|---|---|
| EXERCISE AMOUNT EVALUATION INDEX | INDEX VALUE |
| EXERCISE AMOUNT EQUALIZATION INDEX (Nc) | 1370 |
| EXERCISE AMOUNT DISPERSION INDEX (Oc) | 42 |

FIG.25

| | USER A | USER B | USER C |
|---|---|---|---|
| EXERCISE AMOUNT RELATIVE PARAMETER | | | |
| EXERCISE AMOUNT EQUALIZATION RELATIVE PARAMETER (Y) | 1.06 | 1.05 | 0.89 |
| EXERCISE AMOUNT DISPERSION RELATIVE PARAMETER (Z) | 0.71 | 1.93 | 0.34 |

FIG.28

| TIME | USER A | | | USER B | | | USER C | | |
|---|---|---|---|---|---|---|---|---|---|
| | TOTAL METABOLIC RATE | TOTAL INTAKE | BALANCE | TOTAL INTAKE | TOTAL METABOLIC RATE | BALANCE | TOTAL METABOLIC RATE | TOTAL INTAKE | BALANCE |
| 1 | 1530 | 1620 | 90 | 1480 | 1640 | 160 | 1380 | 1530 | 150 |
| 2 | 1680 | 1480 | -200 | 1460 | 1630 | 170 | 1320 | 1490 | 170 |
| 3 | 1890 | 1840 | 160 | 1510 | 1540 | 30 | 1410 | 1530 | 120 |
| 4 | 1500 | 1630 | 130 | 1490 | 1530 | 40 | 1380 | 1490 | 110 |
| 5 | 1650 | 1690 | 40 | 1480 | 1840 | 360 | 1350 | 1520 | 170 |
| 6 | 1720 | 1820 | 100 | 1915 | 1810 | -105 | 1320 | 1520 | 200 |
| 7 | 1750 | 1735 | 55 | 1980 | 1720 | -260 | 1430 | 1520 | 100 |

FIG.29

| DIET EVALUATION INDEX | USER A | USER B | USER C |
|---|---|---|---|
| CALORIE BALANCE INDEX (N) | 53 | 56 | 146 |
| CALORIE DISPERSION INDEX (O) | 119 | 201 | 37 |

FIG.30

|  | USER A | USER B | USER C |
|---|---|---|---|
| DIET RELATIVE PARAMETER | 0.63 | 0.66 | 1.71 |
| CALORIE BALANCE RELATIVE PARAMETER (Y) | 1.00 | 1.69 | 0.31 |
| CALORIE DISPERSION RELATIVE PARAMETER (Z) | | | |

INFORMATION PROCESSING APPARATUS, DISPLAY DATA PROVIDING METHOD AND PROGRAM

CROSS REFERENCES TO RELATED APPLICATIONS

The present invention contains subject matter related to Japanese Patent Application JP 2008-026700 filed in the Japan Patent Office on Feb. 6, 2008, the entire contents of which being incorporated herein by reference.

BACKGROUND OF THE INVENTION

1. Field of the Invention

The present invention relates to an information processing apparatus, a display data providing method, and a program.

2. Description of the Related Art

In recent years, it has become possible to share text data or image data provided by some user by an unspecified number of people via a homepage or blog (weblog).

User information (for example, information showing the state of a user) can be delivered to an unspecified number of people by images or the like being made public in a homepage or blog as described above, however, on the other hand, privacy of the user may be violated.

Under these situations, a technology to represent the state of a user by images has been under development. For example, a technology disclosed in Japanese Patent Application Laid-Open No. 2006-110340 can be cited as a technology to generate images showing the state of a user's health based on parameter information showing the state of a user's health.

SUMMARY OF THE INVENTION

In recent years, a system called a lifelog to record information about a behavior history of a user has made its debut. In the future, in addition to a form of usage in related art in which information about a user is shared by an unspecified number of people via a homepage or blog, further a form of usage in which information chronologically showing the state of a user corresponding to a user (for example, the user himself (herself)) recorded (hereinafter, referred to as "history information"), for example, in a lifelog system and relative information based on history information of (one or two or more) other users are shared by an unspecified number of people can be supposed.

Here, in related art to show the state of a user by an image, which is an indirect method, instead of directly (for example, numerical values) showing the state of a user, and therefore, there is a possibility that the state of a user can be shown while keeping users' privacy. However, the related art to show the state of a user by images simply generates images of the state of each user based on parameter information of the input state of health. Therefore, even if the related art to show the state of a user by images is used, relative relationships between one user and other users can rarely be shown based on history information showing the state of a user chronologically and it is hopeless to realize the above form of usage supposed in the future.

The present invention has been made in view of the above issue and it is desirable to provide a new and improved information processing apparatus, display data providing method, and program capable of causing an unspecified number of people to share relative information among a plurality of users based on history information while keeping users' privacy.

According to an embodiment of the present invention, there is provided an information processing apparatus capable of communicating with a display apparatus displaying an image, including a storage part storing, user by user, history information showing a user state chronologically, an evaluation processing part deriving, user by user, an evaluation index value corresponding to an evaluation theme requested in a display request transmitted from the display apparatus, by performing a process according to the evaluation theme for each piece of history information of at least two users who are requested to be displayed in the display request, based on the display request, a relative processing part deriving user by user a relative evaluation parameter showing relationship between the users in the evaluation theme based on the evaluation index value derived user by user by the evaluation processing part, and a display data generation part generating display data which shows an evaluation image of each user showing the relationship between the users in the evaluation theme, by generating user by user the evaluation image based on the relative evaluation parameter derived user by user by the relative processing part.

According to such a constitution, an unspecified number of people can be caused to share relative information among a plurality of users based on history information while keeping users' privacy.

The evaluation processing part further derives the evaluation index value for a user other than the users who are requested to be displayed in the display request, using the history information stored in the storage part, and the relative processing part derives the relative evaluation parameter for the users who are requested to be displayed in the display request, based on the evaluation index value derived by the evaluation processing part.

According to such a constitution, relative relationships among users displayed in display data can be represented using relative parameters of higher reliability.

The display data generation part generates display data in which the evaluation image of each user is shown to be grouped.

According to such a constitution, an unspecified number of people can be caused to share relative information among a plurality of users based on history information while keeping users' privacy.

According to the embodiments of the present invention described above, there is provided a display data providing method that can be used in an information processing apparatus, the information processing apparatus including a communication part communicating with a display apparatus displaying an image and a storage part storing, user by user, history information showing user states chronologically, the method including a first derivation step of deriving, user by user, an evaluation index value corresponding to an evaluation theme requested in a display request transmitted from the display apparatus, by performing a process according to the evaluation theme for each piece of history information of at least two users who are requested to be displayed in the display request, upon receiving a reception of the display request, a second derivation step of deriving user by user a relative evaluation parameter showing relationship between the users in the evaluation theme based on the evaluation index value derived user by user in the first derivation step, a generation step of generating display data which shows an evaluation image of each user showing the relationship between the users in the evaluation theme, by generating user by user the evaluation image based on the relative evaluation parameter derived user by user in the second derivation step; and, a transmission step of transmitting the display data generated in the generation step to a display device that have transmitted the display request.

By using such a method, an unspecified number of people can be caused to share relative information among a plurality of users based on history information while keeping users' privacy.

According to the embodiments of the present invention described above, there is provided a program that can be used in an information processing apparatus, the information processing apparatus including a communication part communing with a display device displaying an image and a storage part storing, user by user, history information showing a user state chronologically, the program causing a computer to execute, a first derivation step of deriving, user by user, an evaluation index value corresponding to an evaluation theme requested in a display request transmitted from the display apparatus, by performing a process according to the evaluation theme for each piece of history information of at least two users who are requested to be displayed in the display request, upon receiving a reception of the display request, a second derivation step of deriving user by user a relative evaluation parameter showing relationship between the users in the evaluation theme based on the evaluation index value derived user by user in the first derivation step, a generation step of generating display data which shows an evaluation image of each user showing the relationship between the users in the evaluation theme, by generating user by user the evaluation image based on the relative evaluation parameter derived user by user in the second derivation step, and a transmission step of transmitting the display data generated in the generation step to a display device that have transmitted the display request.

According to such a program, an unspecified number of people can be caused to share relative information among a plurality of users based on history information while keeping users' privacy.

According to the embodiments of the present invention described above, an unspecified number of people can be caused to share relative information among a plurality of users based on history information while keeping users' privacy.

BRIEF DESCRIPTION OF THE DRAWINGS

FIG. 2 is a first explanatory diagram exemplifying history information read based on a specified evaluation theme in the information processing apparatus according to an embodiment of the present invention.

FIG. 3 is an explanatory diagram illustrating an example of evaluation index values and content thereof when the evaluation theme of "asset management" is specified in the information processing apparatus according to an embodiment of the present invention.

FIG. 4 is a first explanatory diagram illustrating a derivation method of evaluation index values when the evaluation theme of "asset management" is specified in the information processing apparatus according to an embodiment of the present invention.

FIG. 7 is an explanatory diagram showing a derivation result of evaluation index values when the evaluation theme of "asset management" is specified in the information processing apparatus according to an embodiment of the present invention.

FIG. 8A is a first explanatory diagram illustrating the derivation method of relative evaluation parameters when the evaluation theme of "asset management" is specified in the information processing apparatus according to an embodiment of the present invention.

FIG. 8B is a first explanatory diagram illustrating the derivation method of relative evaluation parameters when the evaluation theme of "asset management" is specified in the information processing apparatus according to an embodiment of the present invention.

FIG. 8C is a first explanatory diagram illustrating the derivation method of relative evaluation parameters when the evaluation theme of "asset management" is specified in the information processing apparatus according to an embodiment of the present invention.

FIG. 10 is an explanatory diagram showing a derivation result of relative evaluation parameters when the evaluation theme of "asset management" is specified in the information processing apparatus according to an embodiment of the present invention.

FIG. 18 is an explanatory diagram illustrating an example of evaluation index values and content thereof when the evaluation theme of "exercise amount" is specified in the information processing apparatus according to an embodiment of the present invention.

FIG. 19 is a second explanatory diagram exemplifying history information read based on the specified evaluation theme in the information processing apparatus according to an embodiment of the present invention.

FIG. 20A is an explanatory diagram exemplifying standard information used for deriving a total metabolic rate in the information processing apparatus according to an embodiment of the present invention.

FIG. 20B is an explanatory diagram exemplifying standard information used for deriving a total metabolic rate in the information processing apparatus according to an embodiment of the present invention.

FIG. 20C is an explanatory diagram exemplifying standard information used for deriving a total metabolic rate in the information processing apparatus according to an embodiment of the present invention.

FIG. 21 is an explanatory diagram exemplifying the total metabolic rate derived in the information processing apparatus according to an embodiment of the present invention.

FIG. 23 is an explanatory diagram showing a derivation result of evaluation index values when the evaluation theme of "exercise amount" is specified in the information processing apparatus according to an embodiment of the present invention.

FIG. 24A is an explanatory diagram illustrating the derivation method of relative evaluation parameters when the evaluation theme of "exercise amount" is specified in the information processing apparatus according to an embodiment of the present invention.

FIG. 24B is an explanatory diagram illustrating the derivation method of relative evaluation parameters when the evaluation theme of "exercise amount" is specified in the information processing apparatus according to an embodiment of the present invention.

FIG. 24C is an explanatory diagram illustrating the derivation method of relative evaluation parameters when the evaluation theme of "exercise amount" is specified in the information processing apparatus according to an embodiment of the present invention.

FIG. 25 is an explanatory diagram showing a derivation result of relative evaluation parameters when the evaluation theme of "exercise amount" is specified in the information processing apparatus according to an embodiment of the present invention.

FIG. 28 is a third explanatory diagram exemplifying history information read based on the specified evaluation theme in the information processing apparatus according to an embodiment of the present invention.

FIG. 29 is an explanatory diagram showing a derivation result of evaluation index values when the evaluation theme of "diet" is specified in the information processing apparatus according to an embodiment of the present invention.

FIG. 30 is an explanatory diagram showing a derivation result of relative evaluation parameters when the evaluation theme of "diet" is specified in the information processing apparatus according to an embodiment of the present invention.

DETAILED DESCRIPTION OF THE PREFERRED EMBODIMENTS

Figure 1:
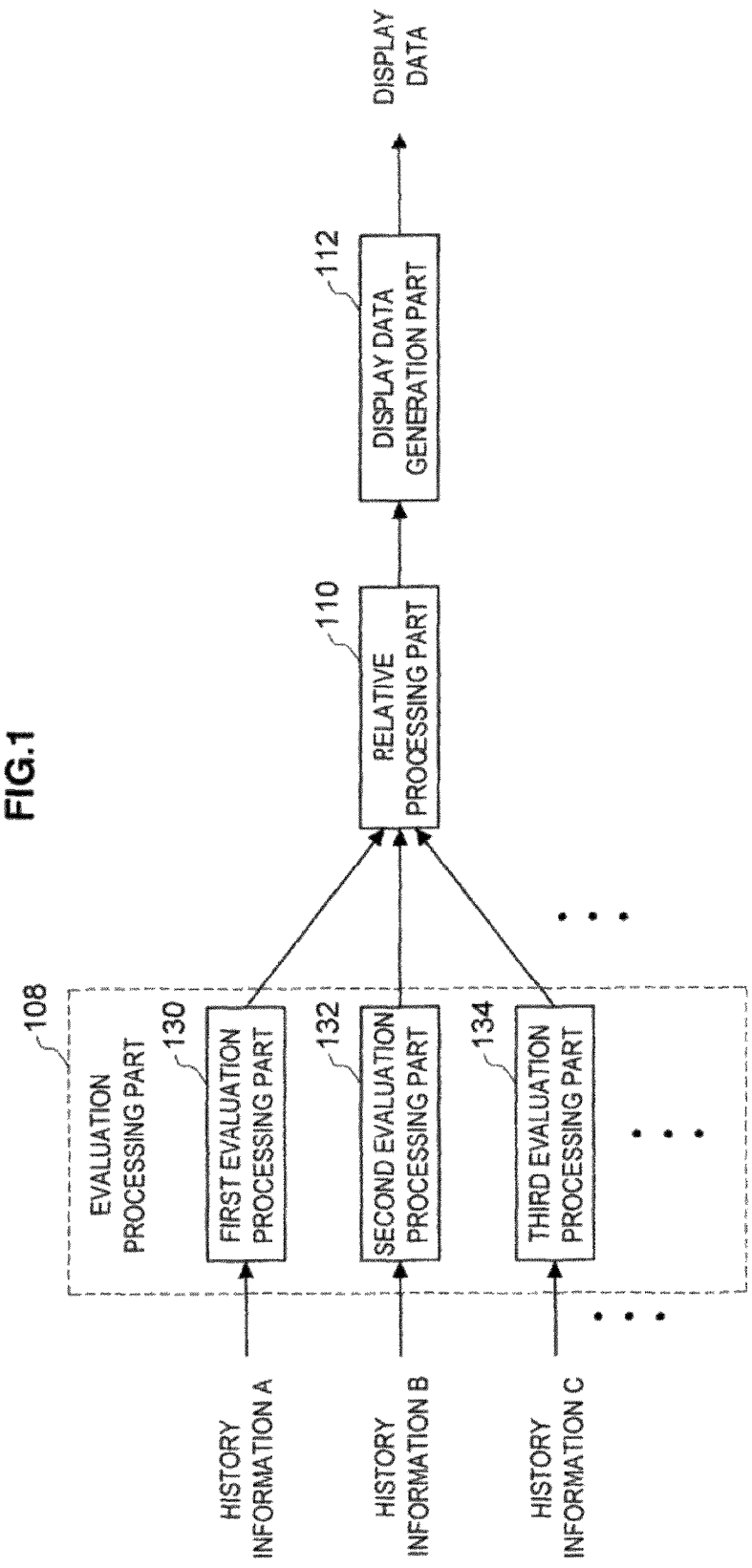
FIG. 1 is an explanatory diagram illustrating an overview of processing of an information processing apparatus according to an embodiment of the present invention.

Hereafter, preferred embodiments of the present invention will be described inn detail with reference to the appended drawings. Note that in this specification and the appended drawings, structural elements that have substantially the same functions and structures are denoted with the same reference numerals and a repeated explanation of these structural elements is omitted.

(Overview of Processing of Information Processing Apparatus According to an Embodiment of the Present Invention)

Before describing the configuration of an information processing apparatus according to an embodiment of the present invention, an overview of processing of an information processing apparatus according to an embodiment of the present invention will be provided. FIG. 1 is an explanatory diagram illustrating an overview of processing of an information processing apparatus according to an embodiment of the present invention. Here, in FIG. 1, a portion of components of an information processing apparatus 100 according to an embodiment of the present invention. An overview of processing of the information processing apparatus 100 according to an embodiment of the present invention will be provided below with reference to FIG. 1 when suitable.

The information processing apparatus 100 enables an unspecified number of people to share relative information among a plurality of users based on history information while keeping users' privacy by performing, for example, processing of (1) or (2) shown below.

(1) Generation of Display Data

The information processing apparatus 100 generates display data corresponding to each of at least two users whose display is requested by a display request based on the display request and showing an evaluation image conforming to the evaluation theme requested by the display request. More specifically, the information processing apparatus 100 generates display data by processing of (1-1) to (1-4) shown below. Here, the above display request is transmitted, for example, from a display apparatus (external apparatus) connected via a network, but not limited to the above method. Concrete examples of the evaluation theme, those of display data, and those of each piece of processing shown below will be described later.

(1-1) Derivation of Evaluation Index Values for Each User

The information processing apparatus 100 reads history information corresponding to a user whose display is requested by a display request, for example, from a storage part provided with the information processing apparatus 100. Then, the information processing apparatus 100 performs evaluation processing in accordance with the evaluation theme shown by the display request for each piece of read history information to derive evaluation index values corresponding to the user requested by the display request. The information processing apparatus 100 can perform evaluation processing for each piece of history information, that is, for each user with an evaluation processing part 108 being provided. In FIG. 1, an example in which history information A corresponding to a user A is processed by a first evaluation processing part 130, and similarly history information B corresponding to a user B is processed by a second evaluation processing part 132 and history information C corresponding to a user C is processed by a third evaluation processing part 134 is shown.

The evaluation processing part 108 is not limited to reading history information itself stored in the storage part and may generate history information for deriving evaluation index values suitable for derivation of evaluation index values such as reading information contained in the history information selectively and processing read information. Incidentally, history information itself stored in the storage part and history information for deriving evaluation index values generated by the evaluation processing part 108 will not be specifically distinguished below and will be called "history information".

Here, history information according to an embodiment of the present invention is, for example, information chronologically showing the state of a user. Examples of history information include, for example, each of [1] to [10], each of [1] to [10] being processed, or a combination of [1] to [10] or a combination of [1] to [10] being processed, but not limited to the above examples.

[1] Buying History Information

The information processing apparatus 100 collects (acquires) information, for example, from a server owned by a company issuing credit cards, a server owned by a shop storing a membership card and purchased articles by combining the membership card and purchased articles, a server owned by a company operating a network shopping site, and a server owned by a company issuing electronic money. Here, for example, information about "when", "where", "what", "how much", and "at what price" the user purchased and information of expenditure (total amount of buying) can be contained in the buying history information, but buying history information is not limited to the above example.

[2] Meal Menu History Information

The information processing apparatus 100 can store, for example, information about meals of information of the buying history as meal menu history information. The information processing apparatus 100 may also store information input by the user as text (for example, "what" is eaten "when") as meal menu history information.

[3] Bank Account History Information

The information processing apparatus 100 can collect bank account history information, for example, from a server owned by a bank. Here, the bank account history information can include, for example, the account number, information about the current balance, deposit information, and information about changes in balance, but not limited to the above example.

[4] Securities Trading History Information

The information processing apparatus 100 can collect securities trading history information, for example, from a server owned by a securities company. Here, the securities trading history information can include, for example, the account number, information about the current balance, information about changes in balance, and profit and loss information, but not limited to the above example.

[5] Sports Gym Utilization History Information

The information processing apparatus 100 can collect sports gym utilization history information, for example, from a server owned by a company running a sports gym. Here, the sports gym utilization history information can include, for example, information about the date/time of utilization and information about the utilization time, but not limited to the above example.

[6] Health Examination History Information

The information processing apparatus 100 can collect health examination history information, for example, from a server owned by a hospital. Here, the health examination history information can include, for example, various kinds of information such as examination results, but not limited to the above example.

[7] Pulse Sensor History Information

The information processing apparatus 100 acquires pulse sensor history information, for example, from a pulse sensor worn by a user. Here, the pulse sensor history information can include, for example, information of chronological changes of pulses of the user measured by the pulse sensor, but not limited to the above example.

[8] Acceleration Sensor History Information

The information processing apparatus 100 acquires acceleration sensor history information, for example, from an acceleration sensor worn by a user. Here, the acceleration sensor history information can include, for example, information of chronological changes of acceleration measured by the acceleration sensor, but not limited to the above example.

[9] Pedometer History Information

The information processing apparatus 100 acquires pedometer history information, for example, from a pedometer worn by a user. Here, the pedometer history information can include, for example, information of chronological changes of the number of steps in a predetermined period measured by the pedometer, but not limited to the above example.

[10] Behavior History Information

The information processing apparatus 100 acquires behavior history information, for example, from content described in an appointment book or blog entered by a user. Here, the information processing apparatus 100 can acquire behavior history of the user using, for example, the technology of character recognition from blogs and the like on the basis of text, but not limited to the above method.

(1-2) Derivation of Relative Evaluation Parameters Showing Relative Relationships Among Users Based on evaluation index values derived for each user in (1-1) described above, the information processing apparatus 100 derives relative evaluation parameters showing relative relationships among users for each user. The information processing apparatus 100 derives relative evaluation parameters by being provided with a relative processing part 110. Here, the relative processing part 110 can derive relative evaluation parameters, for example, by selecting a derivation method in accordance with an evaluation theme based on the evaluation theme requested by a display request.

(1-3) Generation of Evaluation Image

Based on relative evaluation parameters for each user derived in (1-2) described above, the information processing apparatus 100 generates for each user an evaluation image showing relative relationships among users concerning the evaluation theme requested by a display request. The information processing apparatus 100 can generate an evaluation image by being provided with a display data generation part 112.

Here, the information processing apparatus 100 can generate an evaluation image by reading image data stored in the storage part based on the user ID indicating a user or relative evaluation parameters for each user derived in (1-2) described above, but not limited to the above method. For example, the information processing apparatus 100 can generate an evaluation image by reading user image data indicating a user from the storage part based on the user ID indicating the user and processing the user image based on relative evaluation parameters (for example, changing the facial expressions or complexion or changing a pose).

(1-4) Generation of Display Data

The information processing apparatus 100 generates display data corresponding to each of at least two users whose display is requested by a display request and showing an evaluation image conforming to the evaluation theme requested by the display request by combining (grouping) evaluation images for each user generated in (1-3) described above. The information processing apparatus 100 is not limited to generating display data in which generated evaluation images of each user are simply combined and can further generate display data in which an additional image (for example, a seesaw shown in FIG. 12 described later or steps shown in FIG. 13) to indicate relative relationships among users. The information processing apparatus 100 generates display data by being provided with the display data generation part 112.

Here, the information processing apparatus 100 can generate display data in which an evaluation image and an additional image are combined by reading additional image data stored in the storage part based on, for example, the evaluation theme specified by the display request, derived relative evaluation parameters or the like, but not limited to the above method. For example, the information processing apparatus 100 can generate display data combining an evaluation image and an additional image by reading image data stored in the storage part, in which component image data constituting additional images are stored, based on the evaluation theme, derived relative evaluation parameters or the like and processing the read image data (for example, changing the position of the fulcrum of the seesaw).

By performing the processing in (1-1) to (1-4), the information processing apparatus 100 can generate display data corresponding to each of at least two users whose display is requested by a display request and showing an evaluation image conforming to the evaluation theme.

While in the above description, the processing in (1-3) and that in (1-4) are described separately, the information processing apparatus 100 can perform the processing in (1-3) and (1-4) by being provided with the display data generation part 112. Therefore, an information processing apparatus according to an embodiment of the present invention can naturally perform the processing in (1-3) and that in (1-4) as a single piece of processing (a series of pieces of processing).

(2) Transmission/Display of Display Data

The information processing apparatus 100 transmits the display data generated in (1) to an origin device (for example, a display apparatus connected via a network) of display request to cause the origin device to display the display data. Here, the information processing apparatus 100 can transmit the display data to the origin device of display request based on device identification information such as the IP address (Internet Protocol Address) or MAC address (Media Access Control Address) contained in the display request, but not limited to the above method.

The information processing apparatus 100 can cause an unspecified number of people to share relative information among a plurality of users based on history information by the processing in (1) and (2) via display data showing an image in which relative information among the plurality of users based on the history information is indirectly expressed. Therefore, the information processing apparatus 100 can cause an unspecified number of people to share relative information among a plurality of users based on history information while keeping users' privacy.

(Concrete Examples of Various Kinds of Processing and Display Data in Information Processing Apparatus According to an Embodiment of the Present Invention)

Next, concrete examples of various kinds of processing and generated display data in the information processing apparatus 100 according to an embodiment of the present invention will be described using three evaluation themes of "asset management", "exercise amount", and "diet". Naturally, evaluation themes according to an embodiment of the present invention are not limited to the above "asset management", "exercise amount", and "diet". An example of a display request transmitted from a display apparatus requesting relative information among three users of the users A, B and C will be described below, but the processing is not limited to the above example. The information processing apparatus 100 can generate display data showing relative information among any number of at least two users. Further, each piece of the processing of (1-1) to (1-4) will be described below.

[1] First Example

When Evaluation Theme of "Asset Management" is Specified by Display Request (1-1) Derivation of Evaluation Index Values for Each User After receiving a display request transmitted from a display apparatus, the information processing apparatus 100 reads corresponding history information from the storage part based on the evaluation theme specified by the display request and users whose display is requested by the display request. Here, readings of the history information from the storage part are made by the evaluation processing part 108.

FIG. 2 is a first explanatory diagram exemplifying history information read based on a specified evaluation theme in the information processing apparatus 100 according to an embodiment of the present invention. Here, FIG. 2 shows history information when the evaluation processing part 108 extracts information from each piece of buying history information, bank account history information, and securities trading history information stored in the storage part (that is, history information combining buying history information, bank account history information, and securities trading history information). While FIG. 2 shows history information of the user A who is one user specified by the display request, the evaluation processing part 108 can obtain history information having information similar to that in FIG. 2 regarding the users B and C who are other users specified by the display request from the storage part.

Figure 12:
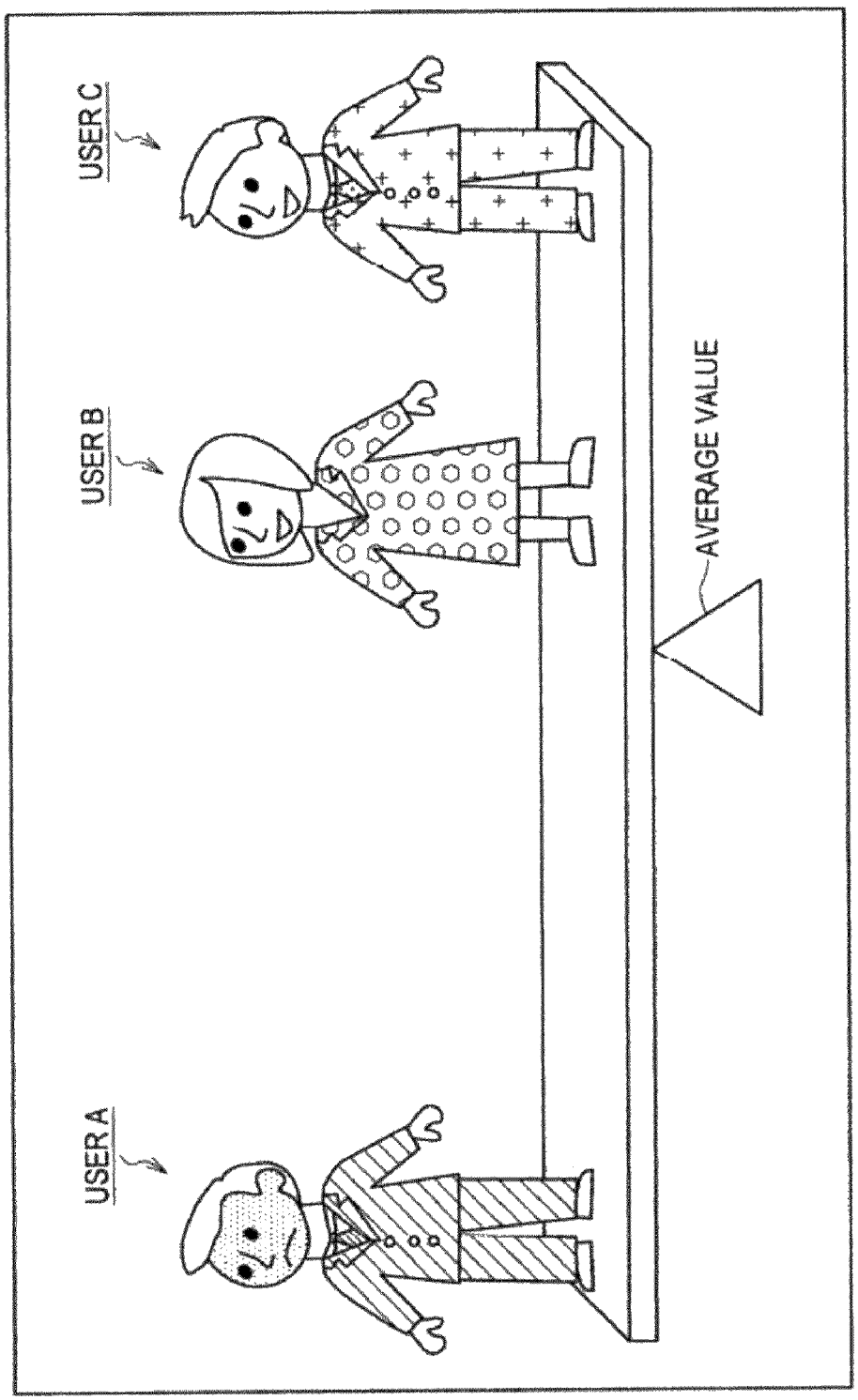
FIG. 12 is an explanatory diagram showing a second example of display data when the evaluation theme of "asset management" is specified in the information processing apparatus according to an embodiment of the present invention.

A reference to FIG. 2 shows that history information when the evaluation theme is "asset management" includes information on the balance (B) and deposit (C) of bank account history information (Ga), expenditure (D) of buying history information (Ka), and the balance (E) and profit and loss (F) of securities trading history information (Sa) and the above information is associated with the time (n). Here, the time n=12 in FIG. 12 shows the current state (that is, the latest history information). The time (n) according to an embodiment of the present invention may be in hours or days, or in units of a predetermined number of days or hours.

Here, the evaluation processing part 108 calculates, for example, the balance (Bn) in the bank account history information (Ga) at the time (n) using the balance (Bn−1), deposit (Cn−1), and expenditure (Dn−1) at the time (n−1). More specifically, the evaluation processing part 108 uses Bn=(Bn−1)+(Cn−1)−(Dn−1) to calculate the balance (Bn). If information on the balance exists in bank account history information stored in the storage part, the evaluation processing part 108 can naturally use the information as the balance (Bn).

The evaluation processing part 108 also calculates the balance (En) of the securities trading history information (Sa) at the time (n) using the balance (En−1) and profit and loss (Fn−1) at the time (n−1). More specifically, the evaluation processing part 108 uses En=(En−1)+(Fn−1) to calculate the balance (En). If information on the balance exists in securities trading history information stored in the storage part, the evaluation processing part 108 can naturally use the information as the balance (En).

FIG. 3 is an explanatory diagram illustrating an example of evaluation index values and content thereof when the evaluation theme of "asset management" is specified in the information processing apparatus 100 according to an embodiment of the present invention. As shown in FIG. 3, the information processing apparatus 100 derives, for example, four evaluation indexes of the asset balance index (L), asset fluctuation index (M), asset variability index (N), and securities constitution index (O) as evaluation index values when the evaluation theme is "asset management". The derivation method of each of the asset balance index (L), asset fluctuation index (M), asset variability index (N), and securities constitution index (O) will be described below.

[A-1] Asset Balance Index (L)/Securities Constitution Index (O)

FIG. 4 is a first explanatory diagram illustrating a derivation method of evaluation index values when the evaluation theme of "asset management" is specified in the information processing apparatus 100 according to an embodiment of the present invention. FIG. 4 shows the asset balance (l), approximate error (h), and securities constitution (o) at each of the time (1) to time (12) shown in FIG. 2.

The asset balance (l) at each time can be calculated as a sum of the balance (B) of the bank account history information (Ga) and the balance (E) of the securities trading history information (Sa) at present. The approximate error (h) at each time can be calculated as a difference between the asset balance (l) and an approximate function fo. Here, the approximate function fo can be determined by the method of least squares based on the asset balance (l). The securities constitution (o) at each time can be calculated by dividing the balance (E) of the securities trading history information (Sa) by the asset balance (l). Naturally, the calculation methods of the asset balance (l), approximate error (h), and securities constitution (o) are not limited to the above methods.

The asset balance index (L) is an index to evaluate current assets of the user. The asset balance index (L) can be derived, for example, as a sum of the balance (B) of the bank account history information (Ga) at present and the balance (E) of the securities trading history information (Sa) at present. In FIG. 4, the time (12) is the current time and the asset balance index (L) is the value of the asset balance (l) at the time (12), that is, "393".

The securities constitution index (O) is an index to evaluate asset constitution content and represents the ratio occupied by the securities balance to assets. The securities constitution index (O) can be derived, for example, by determining the average value of the securities constitution (o) during predetermined times (for example, $0]\cdot n]\cdot 12$). In the example in FIG. 4, the arithmetic mean of the securities constitution (o) becomes "32.3[%]" and thus, "32.3" can be set as the securities constitution index (O). Incidentally, the securities constitution index (O) is not limited to the arithmetic mean and can be derived, for example, by the geometrical mean or weighted average. Like the securities constitution index (O), an "average value" according to an embodiment of the present invention shown below will be derived, for example, by various methods such as the arithmetic mean, geometrical mean, and weighted average.

[A-2] Asset Fluctuation Index (M)

Figure 5:
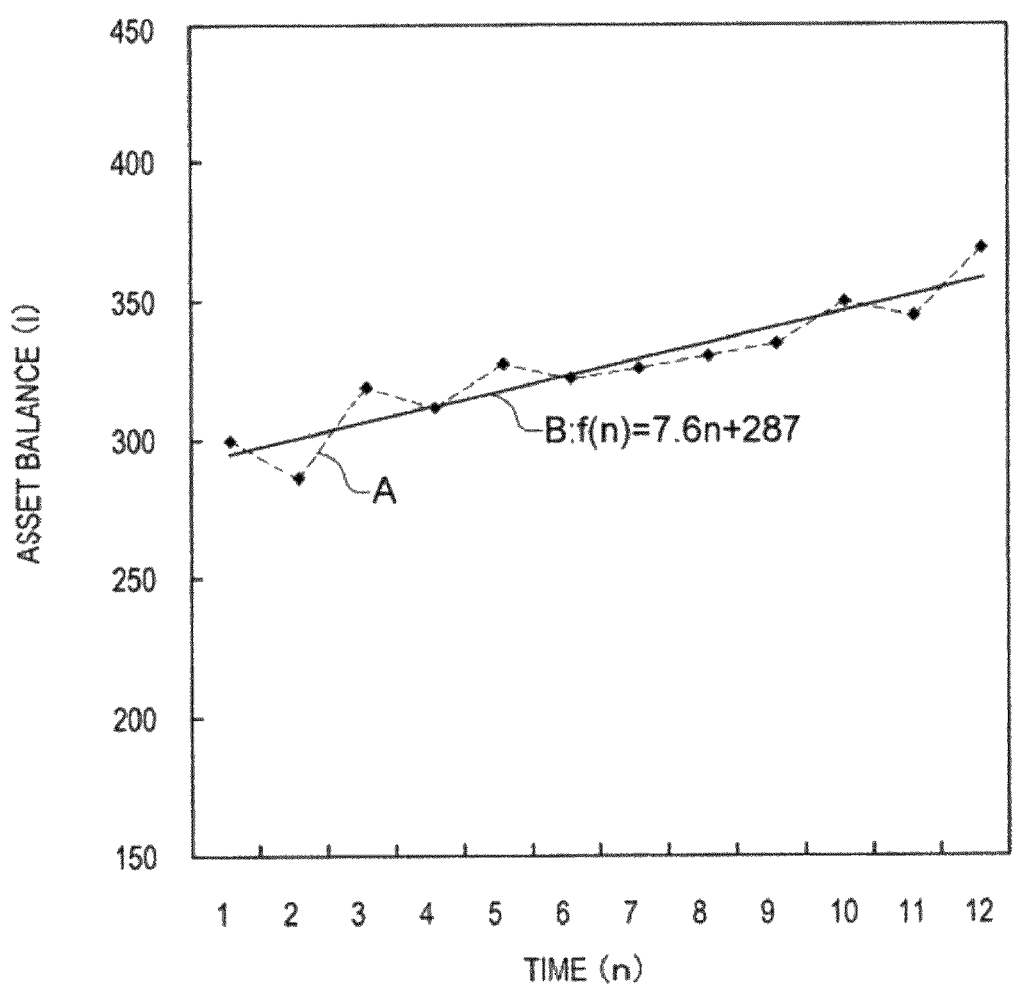
FIG. 5 is a second explanatory diagram illustrating the derivation method of evaluation index values when the evaluation theme of "asset management" is specified in the information processing apparatus according to an embodiment of the present invention.

FIG. 5 is a second explanatory diagram illustrating the derivation method of evaluation index values when the evaluation theme of "asset management" is specified in the information processing apparatus 100 according to an embodiment of the present invention. A line graph A shown in FIG. 5 shows values of the asset balance (l) shown in FIG. 4 and a straight line B shows an approximate function fo determined by the method of least squares based on values of the asset balance (l).

The asset fluctuation index (M) is an index to evaluate whether asset balances of the user are on an upward trend or a downward trend. The asset fluctuation index (M) can be derived, for example, from a gradient of the approximate function fo when a graph of asset balances over time is linearly approximated by the method of least squares. Here, if the gradient of the approximate function fo is positive, asset balances of the user are supposed to be on an upward trend and if the gradient of the approximate function fo is negative, asset balances of the user are supposed to be on a downward trend. The value of the asset fluctuation index (M) shows the degree of increase on an upward trend/the degree of decrease on a downward trend and an increasing numeric value indicates a larger degree of an upward trend/downward trend. In the example in FIG. 5, the approximate function fo is given by fo=7.6n+287, which yields the asset fluctuation index (M) of "7.6".

[A-3] Asset Variability Index (N)

Figure 6:
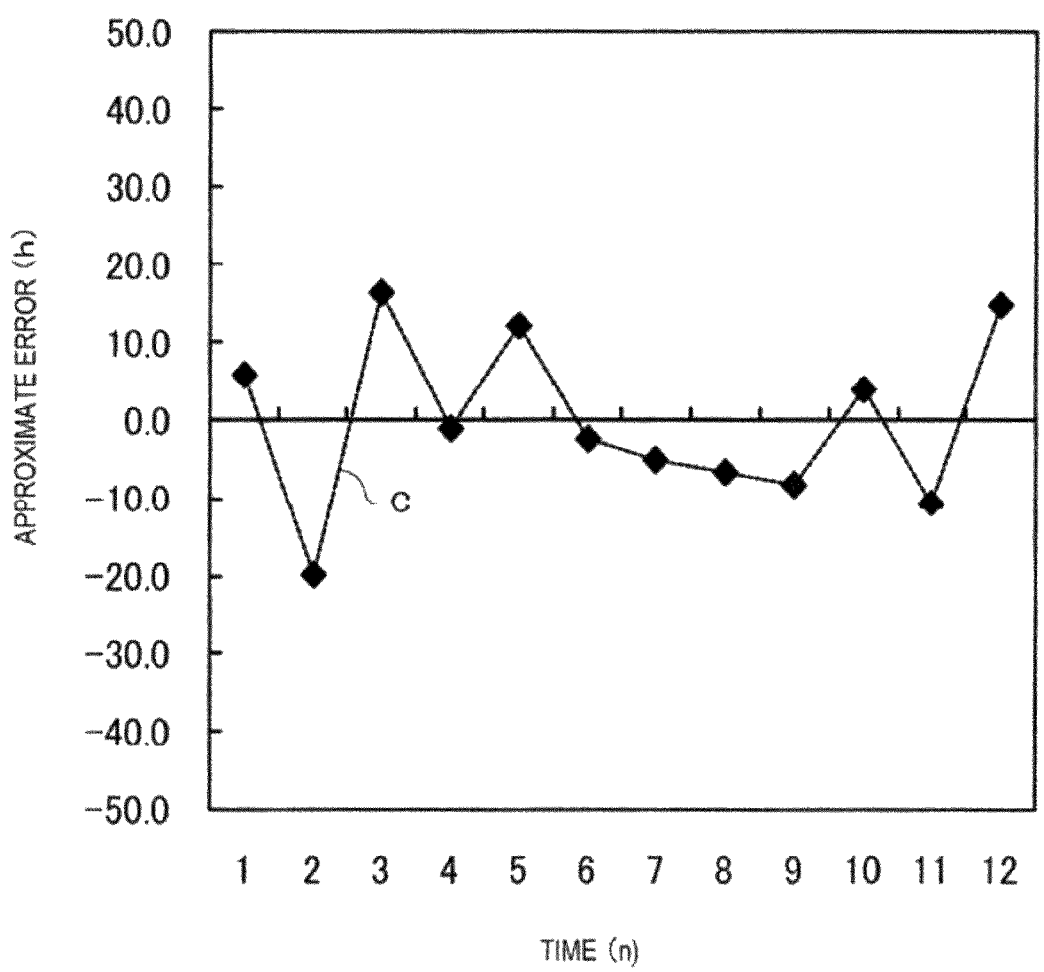
FIG. 6 is a third explanatory diagram illustrating the derivation method of evaluation index values when the evaluation theme of "asset management" is specified in the information processing apparatus according to an embodiment of the present invention.

FIG. 6 is a third explanatory diagram illustrating the derivation method of evaluation index values when the evaluation theme of "asset management" is specified in the information processing apparatus 100 according to an embodiment of the present invention. Here, a line graph C shown in FIG. 6 shows values of the approximate error (h) shown in FIG. 4.

The asset variability index (N) is an index to evaluate the degree of stability of asset balances of the user. The asset variability index (N) can be derived, for example, by determining the standard deviation of values of the approximate error (h) shown in FIG. 4 (FIG. 6). Here, a decreasing value of the asset variability index (N) indicates less change of assets with respect to the time (n) so that the user has more stable assets. In the example in FIG. 4 (FIG. 6), the standard deviation of values of the approximate error (h) shown in FIG. 4 (FIG. 6) becomes "11.0" and thus, the asset variability index (N) becomes "11.0".

The information processing apparatus 100 can derive each of the asset balance index (L), asset fluctuation index (M), asset variability index (N), and securities constitution index (O), for example, by the above derivation methods shown in [A-1] to [A-3].

FIG. 7 is an explanatory diagram showing a derivation result of evaluation index values when the evaluation theme of "asset management" is specified in the information processing apparatus 100 according to an embodiment of the present invention and shows evaluation index values (index numbers) derived based on history information corresponding to the user A shown in FIG. 2. As shown in FIG. 7, the evaluation processing part 108 can derive the asset balance index "393", asset fluctuation index "7.6", asset variability index "11.0", and securities constitution index "32.3" as evaluation index values corresponding to the user A when the evaluation theme of "asset management" is specified based on a display request.

(1-2) Derivation of Relative Evaluation Parameters Showing Relative Relationships Among Users Based on evaluation index values derived for each user in (1-1) described above, the information processing apparatus 100 derives relative evaluation parameters showing relative relationships among users for each user. Here, derivation of relative evaluation parameters is performed by the relative processing part 110.

FIG. 8A to FIG. 8C are first explanatory diagrams illustrating the derivation method of relative evaluation parameters when the evaluation theme of "asset management" is specified in the information processing apparatus 100 according to an embodiment of the present invention. FIG. 8A exemplifies evaluation index values corresponding to the user A and is the same as FIG. 7. FIG. 8B exemplifies evaluation indexes corresponding to the user B derived by the derivation methods shown in [A-1] to [A-3] and FIG. 8C exemplifies evaluation indexes corresponding to the user C derived by the derivation methods shown in [A-1] to [A-3]. The derivation method of relative evaluation parameters when the evaluation theme of "asset management" is specified will be described below by taking an example of evaluation index values of the user A to user C shown in FIG. 8A to FIG. 8C respectively.

When there is a plurality of sets of evaluation index values for each user derived by the evaluation processing part 108, as shown in FIG. 8A to FIG. 8C, the relative processing part 110 derives a relative evaluation parameter for each evaluation index value. Incidentally, the relative processing part 110 can naturally derive one relative evaluation parameter based on evaluation index values derived by the evaluation processing part 108 or a plurality of more or less relative evaluation parameters than the number of evaluation index values derived by the evaluation processing part 108. An example in which the relative processing part 110 derives an asset balance relative parameter (W) corresponding to the asset balance index (L) shown in FIG. 8A to FIG. 8C, an asset fluctuation relative parameter (X) corresponding to the asset fluctuation index (M), an asset variability relative parameter (Y) corresponding to the asset variability index (N), and a securities constitution relative parameter (Z) corresponding to the securities constitution index (O) will be used below to describe derivation of relative evaluation parameters.

[a-1] Asset Balance Relative Parameter (W)

Figure 9:
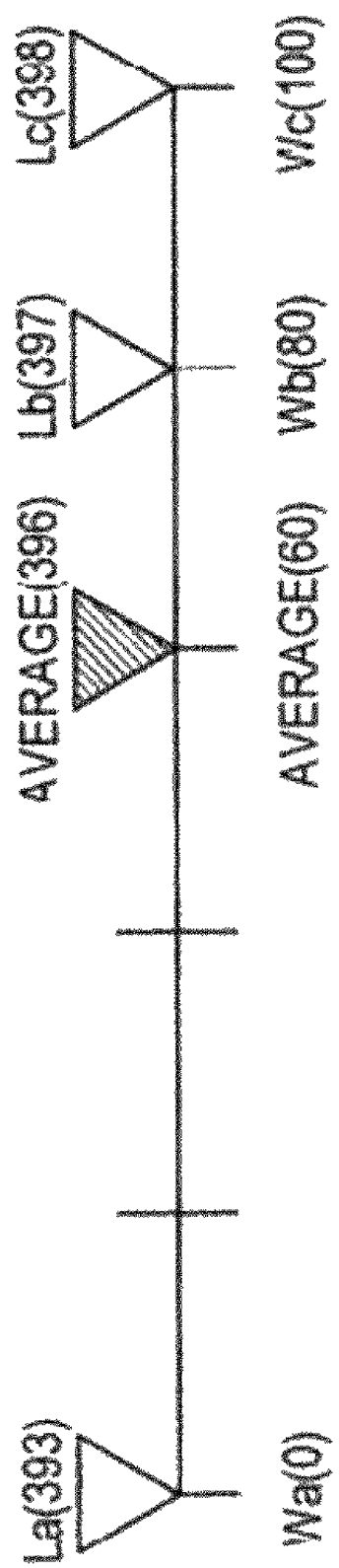
FIG. 9 is a second explanatory diagram illustrating the derivation method of relative evaluation parameters when the evaluation theme of "asset management" is specified in the information processing apparatus according to an embodiment of the present invention.

FIG. 9 is a second explanatory diagram illustrating the derivation method of relative evaluation parameters when the evaluation theme of "asset management" is specified in the information processing apparatus 100 according to an embodiment of the present invention. Here, FIG. 9 is a diagram illustrating the derivation method of the asset balance relative parameter (W).

The relative processing part 110 makes ratio conversions based on asset balance indexes (L: La, Lb, and Lc) of the user A, user B, and user C so that the maximum value of the asset balance index becomes 100 and the minimum value thereof becomes 0. In the example in FIG. 8A to FIG. 8C, the asset balance indexes are given as (L: La, Lb, and Lc)=(393, 397, 398) and thus, the asset balance relative parameter (Wa) corresponding to the user A becomes 0, the asset balance relative parameter (Wc) corresponding to the user C becomes 100, and the asset balance relative parameter (Wb) corresponding to the user B becomes 80. Naturally, the derivation method of the asset balance relative parameters (W) according to an embodiment of the present invention is not limited to the above method.

The relative processing part 110 can also calculate an average value of the asset balance indexes (La, Lb, Lc) of the user A, user B, and user C and convert the calculated average value to the above ratio to define the ratio corresponding to the average value as an asset balance relative parameter (W). By including information about the average value in the asset balance relative parameter (W), relative relationships of asset balance indexes of each of the user A, user B, and user C can be made more precise.

Further, the relative processing part 110 can include information about positive/negative asset balance indexes of each of the user A, user B, and user C relative to the asset balance relative parameter (W) in the asset balance relative parameter (W). By including information about positive/negative asset balance indexes in the asset balance relative parameter (W), whether each of the user A, user B, and user C has debts (for example, a negative value indicates that a user has a debt) can be shown.

By performing the above processing, the relative processing part 110 derives the asset balance relative parameters (W: Wa, Wb, Wc, average) as (W: Wa, Wb, Wc, average)=(positive; 0, positive; 80, positive; 100, positive; 60) when evaluation index values in FIG. 8A to FIG. 8C are given.

[a-2] Asset Fluctuation Relative Parameter (X)

The relative processing part 110 derives asset fluctuation relative parameters (X: Xa, Xb, Xc) corresponding to each of the user A, user B, and user C by calculating an average value of the asset fluctuation index from the asset fluctuation indexes (M: Ma, Mb, Mc) of the user A, user B, and user C respectively and defining the calculated average value as a reference value (0). More specifically, the relative processing part 110 derives the asset fluctuation relative parameters (X: Xa, Xb, Xc)=(9.1, 1.2, −10.3), for example, by using Formula 1 to Formula 3 shown below. Naturally, the derivation method of the asset fluctuation relative parameter (X) according to an embodiment of the present invention is not limited to the method using Formula 1 to Formula 3.

$$Xa = Ma - \frac{Ma + Mb + Mc}{3} \qquad \text{[Formula 1]}$$

$$Xb = Mb - \frac{Ma + Mb + Mc}{3} \qquad \text{[Formula 2]}$$

$$Xc = Mc - \frac{Ma + Mb + Mc}{3} \quad \text{[Formula 3]}$$

The relative processing part 110 can also include information about positive/negative asset fluctuation indexes of each of the user A, user B, and user C relative to the asset fluctuation relative parameter (X) in the asset fluctuation relative parameter (X). By including information about positive/negative asset fluctuation indexes in the asset fluctuation relative parameter (X), whether assets of each of the user A, user B, and user C are on an upward trend (for example, a positive asset fluctuation index) or a downward trend (for example, a negative asset fluctuation index) can be shown.

By performing the above processing, the relative processing part 110 derives the asset fluctuation relative parameters (X: Xa, Xb, Xc) as (X: Xa, Xb, Xc)=(positive; 9.1, negative; 1.2, negative; −10.3) when evaluation index values in FIG. 8A to FIG. 8C are given.

[a-3] Asset Variability Relative Parameter (Y)

The relative processing part 110 derives asset variability relative parameters (Y: Ya, Yb, Yc) corresponding to each of the user A, user B, and user C by calculating an average value of the asset variability index from the asset variability indexes (N: Na, Nb, Nc) of the user A, user B, and user C respectively and defining the calculated average value as a reference value (1.0). More specifically, the relative processing part 110 derives the asset variability relative parameters (Y: Ya, Yb, Yc)=(0.5, 0.2, 2.4), for example, by using Formula 4 to Formula 6 shown below. Here, as described above, a decreasing value of the asset variability index (N) indicates that the user has more stable assets. That is, the asset variability relative parameter (Y) derived as described above based on the asset variability index (N) also shows that the user has more stable assets as the value thereof decreases. Naturally, the derivation method of the asset variability relative parameter (Y) according to an embodiment of the present invention is not limited to the method using Formula 4 to Formula 6.

$$Ya = \frac{3Na}{Na + Nb + Nc} \quad \text{[Formula 4]}$$

$$Yb = \frac{3Nb}{Na + Nb + Nc} \quad \text{[Formula 5]}$$

$$Yc = \frac{3Nc}{Na + Nb + Nc} \quad \text{[Formula 6]}$$

[a-4] Securities Constitution Relative Parameter (Z)

The relative processing part 110 derives securities constitution relative parameters (Z: Za, Zb, Zc) corresponding to each of the user A, user B, and user C by calculating an average value of the securities constitution index from the securities constitution indexes (O: Oa, Ob, Oc) of the user A, user B, and user C respectively and defining the calculated average value as a reference value (1.0). More specifically, the relative processing part 110 derives the securities constitution relative parameters (Z: Za, Zb, Zc)=(0.7, 0.8, 1.2), for example, by using Formula 7 to Formula 9 shown below. Here, the securities constitution index (O) shows the ratio (securities holding ratio) occupied by securities balance to assets and thus, an increasing value of the securities constitution relative parameter (Z) indicates that the ratio occupied by securities balance to assets is larger. Naturally, the derivation method of the securities constitution relative parameter (Z) according to an embodiment of the present invention is not limited to the method using Formula 7 to Formula 9.

$$Za = \frac{3Oa}{Oa + Ob + Oc} \quad \text{[Formula 7]}$$

$$Zb = \frac{3Ob}{Oa + Ob + Oc} \quad \text{[Formula 8]}$$

$$Zc = \frac{3Oc}{Oa + Ob + Oc} \quad \text{[Formula 9]}$$

The information processing apparatus 100 can derive the asset balance relative parameter (W), the asset fluctuation relative parameter (X), the asset variability relative parameter (Y), and the securities constitution relative parameter (Z), for example, by the above derivation methods shown in [a-1] to [a-4].

FIG. 10 is an explanatory diagram showing a derivation result of relative evaluation parameters when the evaluation theme of "asset management" is specified in the information processing apparatus 100 according to an embodiment of the present invention and shows relative evaluation parameters (the asset balance relative parameter (W), the asset fluctuation relative parameter (X), the asset variability relative parameter (Y), and the securities constitution relative parameter (Z)) derived based on evaluation index values corresponding to the user A, user B, and user C shown in FIG. 8A to FIG. 8C. As shown in FIG. 10, the evaluation processing part 108 can derive the relative evaluation parameters corresponding to each of the user A, user B, and user C when the evaluation theme of "asset management" is specified based on a display request by the above derivation methods shown in [a-1] to [a-4].

(1-3/1-4) Generation of Evaluation Image/Generation of Display Data

The information processing apparatus 100 generates an evaluation image showing relative relationships among users regarding the evaluation theme for each user based on relative evaluation parameters for each user derived in (1-2) described above. Then, the information processing apparatus 100 generates, based on the evaluation image generated for each user, display data showing, for example, a combination of the evaluation images of each user or the evaluation image of each user and an additional image indicating relative relationships among users. Here, generation of an evaluation image is performed by the display data generation part 112.

Examples of display data when the evaluation theme of "asset management" is specified will be shown below by taking an example of relative evaluation parameters (the asset balance relative parameter (W), the asset fluctuation relative parameter (X), the asset variability relative parameter (Y), and the securities constitution relative parameter (Z)) of each of the user A, user B, and user C shown in FIG. 10.

[I-1] Display Data Based on Asset Balance Relative Parameter (W)

First Example

Figure 11:
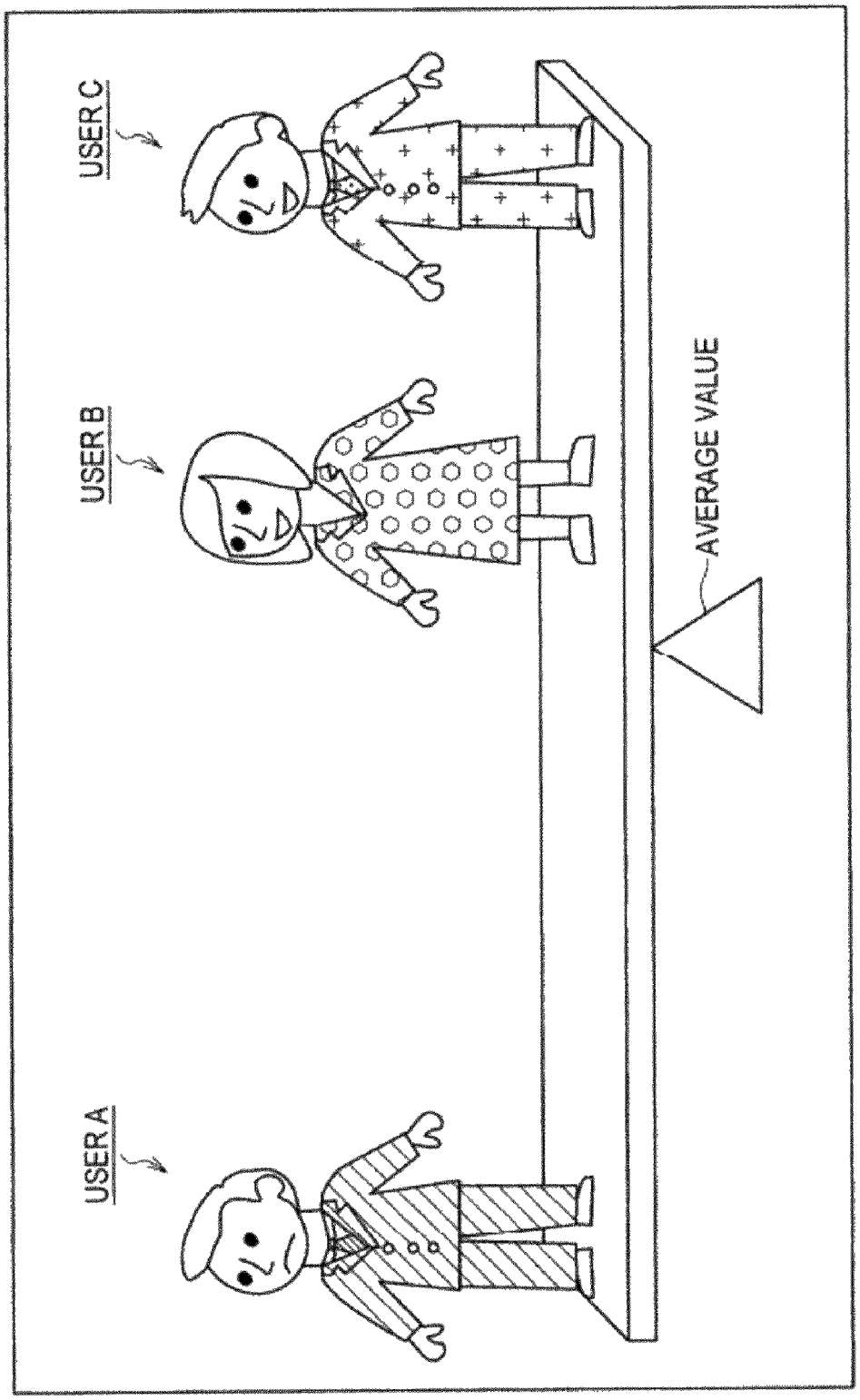
FIG. 11 is an explanatory diagram showing a first example of display data when the evaluation theme of "asset management" is specified in the information processing apparatus according to an embodiment of the present invention.

FIG. 11 is an explanatory diagram showing a first example of display data when the evaluation theme of "asset management" is specified in the information processing apparatus 100 according to an embodiment of the present invention. Here, the FIG. 11 shows the first example of display data generated by the information processing apparatus 100 based on the asset balance relative parameter (W) being displayed in a display screen of a display apparatus. FIG. 11 also shows an example of display data based on the asset balance relative parameter (W) shown in FIG. 10, representing relative relationships of asset balances among the user A to user C.

The display data generation part 112 compares the value of the asset balance relative parameter (W) of each user and the average value of the asset balance relative parameter (W) to generate an evaluation image in which the size of the value relative to the average value is represented by an expression. In the example in FIG. 10, the value of the asset balance relative parameter (W) of the user A is smaller than the average value and values of the asset balance relative parameter (W) of the user B and user C are larger than the average value. Therefore, in the case of FIG. 10, the display data generation part 112 sets, for example, a smiling face as the facial expression of the evaluation image showing each of the user B and user C and a contrasting expression as the facial expression of the evaluation image showing the user A.

To show relative relationships of asset balances of the user A to user C more clearly, the display data generation part 112 generates display data showing an image combining an additional image showing a seesaw having a fulcrum as the average value of the asset balance relative parameter (W) and evaluation images of each of the user A to user C. More specifically, the display data generation part 112 generates display data in which the evaluation image of each user is arranged on the seesaw in accordance with the value of the asset balance relative parameter (W) of each user after setting, for example, the left end (The left end when facing the display screen. The horizontal direction and vertical direction will use a case facing the display screen as a reference below) of the seesaw as the value (0) of the asset balance relative parameter (W) and the right end as the value (100) of the asset balance relative parameter (W).

By performing the above processing, as shown in FIG. 11, the display data generation part 112 can generate display data in which the position of the fulcrum of the seesaw is set as the average value and asset balances of the user A to user C are relatively represented by the distance from the fulcrum. The display data generation part 112 also changes the facial expression of the evaluation image showing each user constituting the display data to further make clear relative relationships of asset balances of the user A to user C to improve visibility.

Second Example

In the first example of display data when the evaluation theme of "asset management" is specified shown in FIG. 11 an example of relatively representing asset balances of the user A to user C using a seesaw is shown. However, the representation of relative relationships of asset balances using a seesaw is not limited to the first example shown in FIG. 11.

FIG. 12 is an explanatory diagram showing a second example of display data when the evaluation theme of "asset management" is specified in the information processing apparatus 100 according to an embodiment of the present invention. Here, FIG. 12 shows the second example of display data generated by the information processing apparatus 100 based on the asset balance relative parameter (W) being displayed in a display screen of a display apparatus. FIG. 12 is another example in which relative relationships of asset balances of the user A to user C are represented by a seesaw and an example in which information about the positive/negative asset balance index of the asset balance relative parameter (W) of the user A shown in FIG. 10 is assumed "negative" and other values are the same as shown in FIG. 10.

Information about the positive/negative asset balance index of the asset balance relative parameter (W) shows, as described above, whether or not the user has a debt and, for example, if information about the positive/negative asset balance index of the asset balance relative parameter (W) is "negative", the relevant user is shown to have a debt. Thus, as shown in FIG. 12, the display data generation part 112 changes the evaluation image corresponding to the user A whose information about the positive/negative asset balance index of the asset balance relative parameter (W) is "negative", for example, to an evaluation image in which the complexion is drawn in blue (an example of the evaluation image in which the complexion is changed).

By changing the complexion of the evaluation image in accordance with information about the positive/negative asset balance index of the asset balance relative parameter (W), as described above, the display data generation part 112 can generate display data with more information content than the first example shown in FIG. 11.

While FIG. 12 shows an example in which the complexion of the evaluation image corresponding to the user A whose information about the positive/negative asset balance index is "negative" is changed based on information about the positive/negative asset balance index of the asset balance relative parameter (W), the second example of display data when the evaluation theme of "asset management" is specified is not limited to the above example. For example, the display data generation part 112 can further change the complexion of the user B and user C whose information about the positive/negative asset balance index is "positive" in accordance with the value of the asset balance relative parameter (W) by referencing the value of the asset balance relative parameter (W).

Here, the display data generation part 112 can generate an evaluation image in which the complexion in accordance with the value of the asset balance relative parameter (W) of each user is set, for example, by using a Look-up Table in which the value of the asset balance relative parameter (W) and a parameter indicating the complexion are associated, but not limited to the above method.

Third Example

Figure 13:
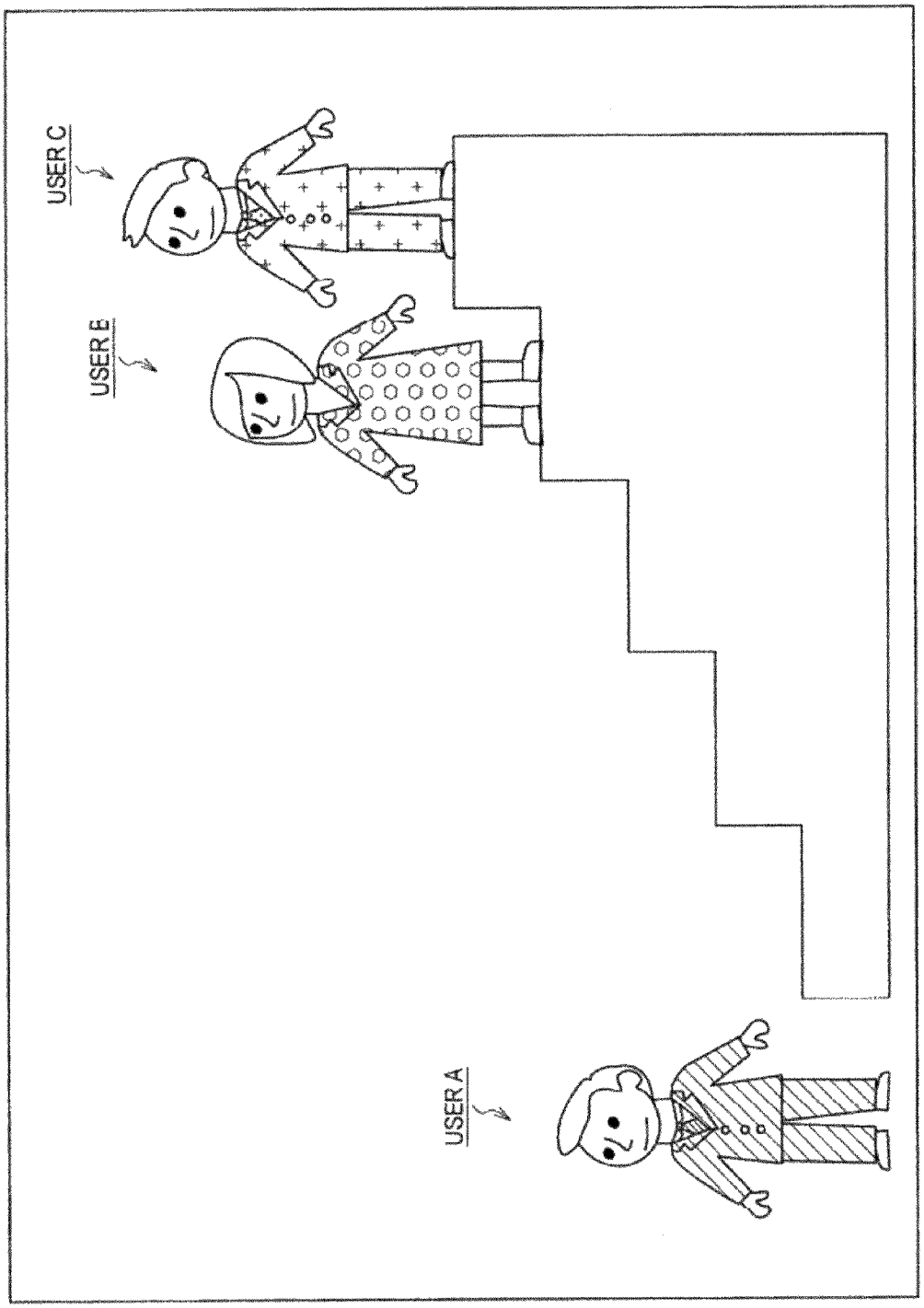
FIG. 13 is an explanatory diagram showing a third example of display data when the evaluation theme of "asset management" is specified in the information processing apparatus according to an embodiment of the present invention.

In the first example shown in FIG. 11 and the second example shown in FIG. 12, asset balances of the user A to user C are relatively represented using a seesaw. However, the mode of representation of relative relationships of asset balances according to an embodiment of the present invention is not limited to the examples shown in FIG. 11 and FIG. 12. FIG. 13 is an explanatory diagram showing a third example of display data when the evaluation theme of "asset management" is specified in the information processing apparatus 100 according to an embodiment of the present invention. Here, FIG. 13 shows the third example of display data generated by the information processing apparatus 100 based on the asset balance relative parameter (W) being displayed in a display screen of a display apparatus. FIG. 13 also shows an example of display data based on the asset balance relative parameter (W) shown in FIG. 10.

As shown in FIG. 13, the display data generation part 112 can generate display data in which the evaluation image of each user is arranged on the step (additional image) based on the value of the asset balance relative parameter (W) of each of the user A to user C. More specifically, the display data generation part 112 arranges an evaluation image corresponding to a user having a larger value at a higher position in accordance with the magnitude of the value of the asset balance relative parameter (W). By changing the position of arrangement on the steps based on the value of the asset balance relative parameter (W), the display data generation part 112 can represent relative relationships of asset balances of the user A to user C by the position of evaluation image.

While FIG. 13 shows an example in which the expression and complexion of the evaluation image of each of the user A to user C are the same, like FIG. 11 and FIG. 12, the display data generation part 112 can naturally generate display data in which the expression or complexion of an evaluation image is changed.

Fourth Example

Figure 14:
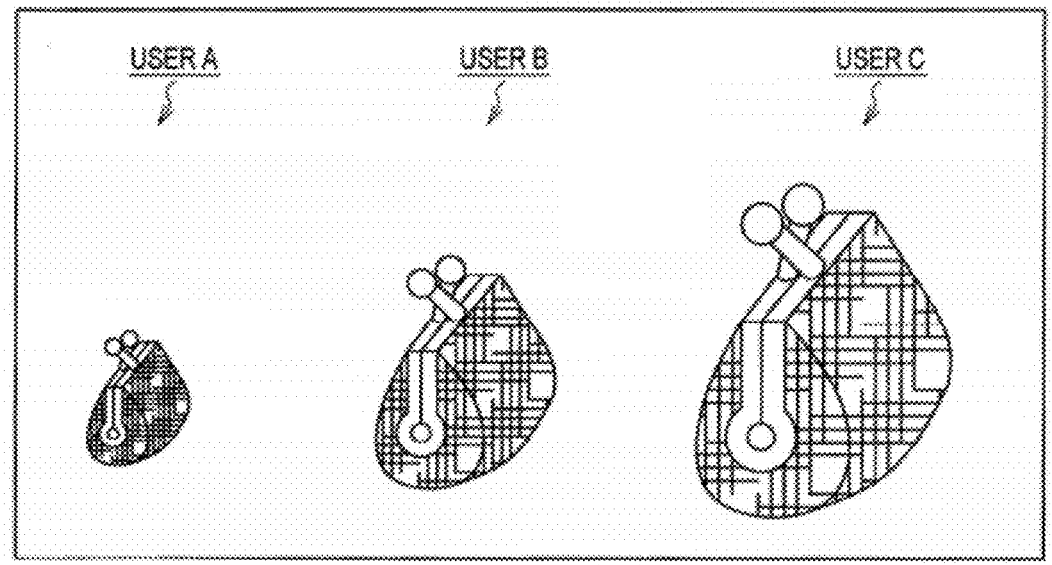
FIG. 14 is an explanatory diagram showing a fourth example of display data when the evaluation theme of "asset management" is specified in the information processing apparatus according to an embodiment of the present invention.

In the first to third examples shown in FIG. 11 to FIG. 13, the evaluation image showing each user is represented by an image showing a person and an additional image such as a seesaw or steps is together shown. However, the mode of representation of relative relationships of asset balances according to an embodiment of the present invention is not limited to examples in which the evaluation image showing each user is represented by an image showing a person and an additional image is together shown. FIG. 14 is an explanatory diagram showing a fourth example of display data when the evaluation theme of "asset management" is specified in the information processing apparatus 100 according to an embodiment of the present invention. Here, FIG. 14 shows the fourth example of display data generated by the information processing apparatus 100 based on the asset balance relative parameter (W) being displayed in a display screen of a display apparatus. FIG. 14 also shows an example of display data based on the asset balance relative parameter (W) shown in FIG. 10.

The display data generation part 112 generates an evaluation image representing each user by an image showing a wallet and the size of the wallet is set based on the value of the asset balance relative parameter (W) of each of the user A to user C. Then, the display data generation part 112 generates display data in which evaluation images generated for each user are combined. For example, as shown in FIG. 14, the display data generation part 112 can represent relative relationships of asset balances of the user A to user C by the sizes of images showing wallets corresponding to each user being set based on the value of the asset balance relative parameter (W). The display data generation part 112 can also generate display data in which relative relationships of asset balances of the user A to user C are represented by an evaluation image only.

The information processing apparatus 100 can generate display data in which relative relationships of asset balances of the user A to user C are represented based on the asset balance relative parameter (W) by using the modes of representation shown in FIG. 11 to FIG. 14. Naturally, the mode of representation of relative relationships based on the asset balance relative parameter (W) according to an embodiment of the present invention is not limited to the examples shown in FIG. 11 to FIG. 14.

[I-2] Display Data Based on Asset Fluctuation Relative Parameter (X)

Figure 15:
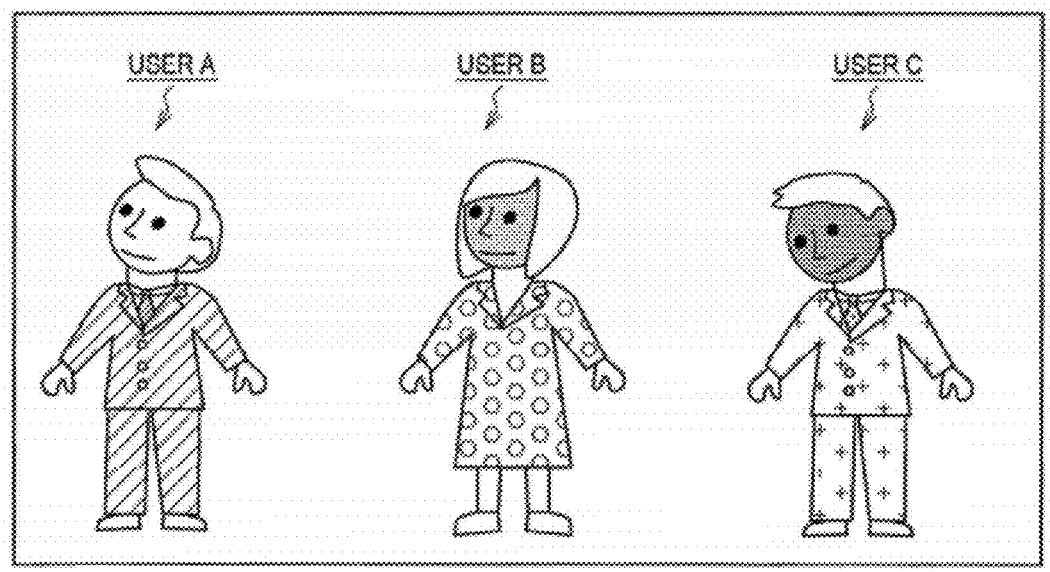
FIG. 15 is an explanatory diagram showing a fifth example of display data when the evaluation theme of "asset management" is specified in the information processing apparatus according to an embodiment of the present invention.

Next, an example of display data based on the asset fluctuation relative parameter (X) according to an embodiment of the present invention will be shown. FIG. 15 is an explanatory diagram showing a fifth example of display data when the evaluation theme of "asset management" is specified in the information processing apparatus 100 according to an embodiment of the present invention. FIG. 15 shows an example of display data generated by the information processing apparatus 100 based on the asset fluctuation relative parameter (X) being displayed in a display screen of a display apparatus. Also, FIG. 15 shows an example of display data based on the asset fluctuation relative parameter (X) shown in FIG. 10.

As shown in FIG. 15, the display data generation part 112 generates display data in which evaluation images having a face angle set, for example, in accordance with the value of the asset fluctuation relative parameter (X) are combined. The display data generation part 112 can relatively show the degree of increase/decrease of assets of the user A to user C by the face angle being set in accordance with the value of the asset fluctuation relative parameter (X) for each user.

Here, the display data generation part 112 can generate an evaluation image in which the angle is set in accordance with the value of the asset fluctuation relative parameter (X) for each user by using, for example, a Look-up Table in which the value of the asset fluctuation relative parameter (X) and the angle are associated.

The display data generation part 112 also generates display data in which evaluation images having the complexion set in accordance with the value of the asset fluctuation relative parameter (X) are combined. The display data generation part 112 can relatively show an upward trend/downward trend of assets of the user A to user C by the complexion being set in accordance with the value of the asset fluctuation relative parameter (X) for each user.

Here, the display data generation part 112 can generate an evaluation image in which the complexion in accordance with the value of the asset fluctuation relative parameter (X) of each user is set by using, for example, a Look-up Table in which the value of the asset fluctuation relative parameter (X) and a parameter showing the complexion are associated.

As shown in FIG. 15, the display data generation part 112 can relatively show the degree of increase/decrease of assets and an upward trend/downward trend of assets of the user A to user C by the angle of face or the complexion being set in accordance with the value of the asset fluctuation relative parameter (X) for each user.

While FIG. 15 shows an example in which both the angle of face and the complexion are relatively represented, but the representation is not limited to the above example and the display data generation part 112 can generate display data for relative representation using one of the angle of face and the complexion. Naturally, the mode of representation of relative relationships based on the asset fluctuation relative parameter (X) according to an embodiment of the present invention is not limited to the example (example represented by the angle of face and/or the complexion) shown in FIG. 15.

[I-3] Display Data Based on Asset Variability Relative Parameter (Y)

Figure 16:
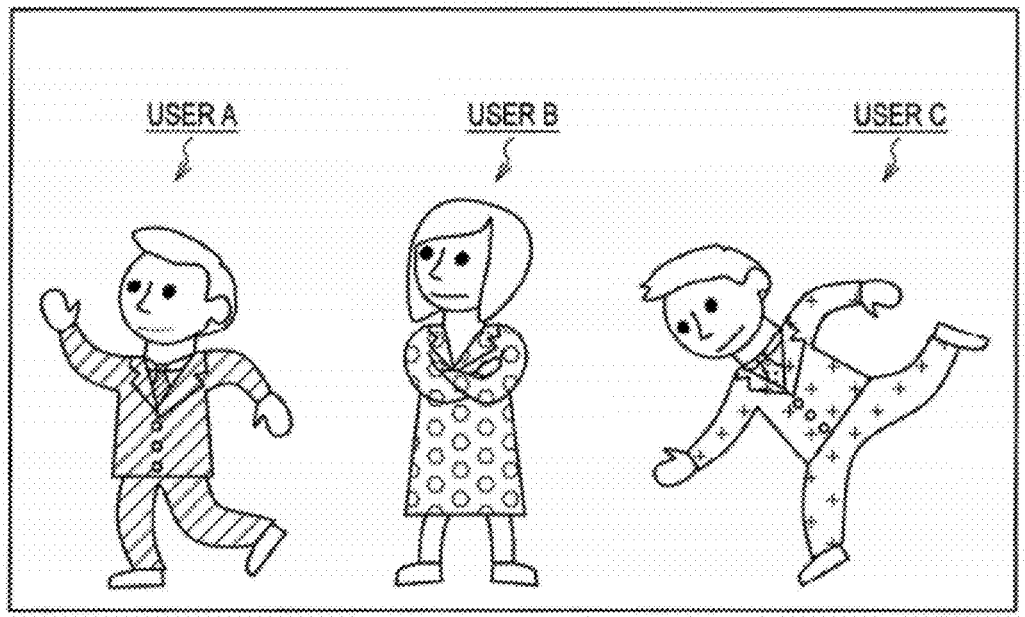
FIG. 16 is an explanatory diagram showing a sixth example of display data when the evaluation theme of "asset management" is specified in the information processing apparatus according to an embodiment of the present invention.

Next, an example of display data based on the asset variability relative parameter (Y) according to an embodiment of the present invention will be shown. FIG. 16 is an explanatory diagram showing a sixth example of display data when the evaluation theme of "asset management" is specified in the information processing apparatus 100 according to an embodiment of the present invention. FIG. 16 shows an example of display data generated by the information processing apparatus 100 based on the asset variability relative parameter (Y) being displayed in a display screen of a display apparatus. Also, FIG. 16 shows an example of display data based on the asset variability relative parameter (Y) shown in FIG. 10.

As shown in FIG. 16, the display data generation part 112 generates display data in which evaluation images representing the degree of stability, for example, in accordance with the value of the asset variability relative parameter (Y) by a pose are combined. The asset variability relative parameter (Y) shows, as described above, that the user has more stable assets as the value thereof decreases and the degree of asset stability in the asset variability relative parameter (Y) shown in FIG. 10 is in the order of "user B>user A>user C". The display data generation part 112 can generate an evaluation image in which, based on, for example, the order of degree of asset stability based on the asset variability relative parameter (Y), a pose in accordance with the order of each is set, but not limited to the above method.

As shown in FIG. 16, the display data generation part 112 can relatively represent the degree of asset stability of the user A to user C by the pose being set in accordance with the asset variability relative parameter (Y).

[I-4] Display Data Based on Securities Constitution Relative Parameter (Z)

Figure 17:
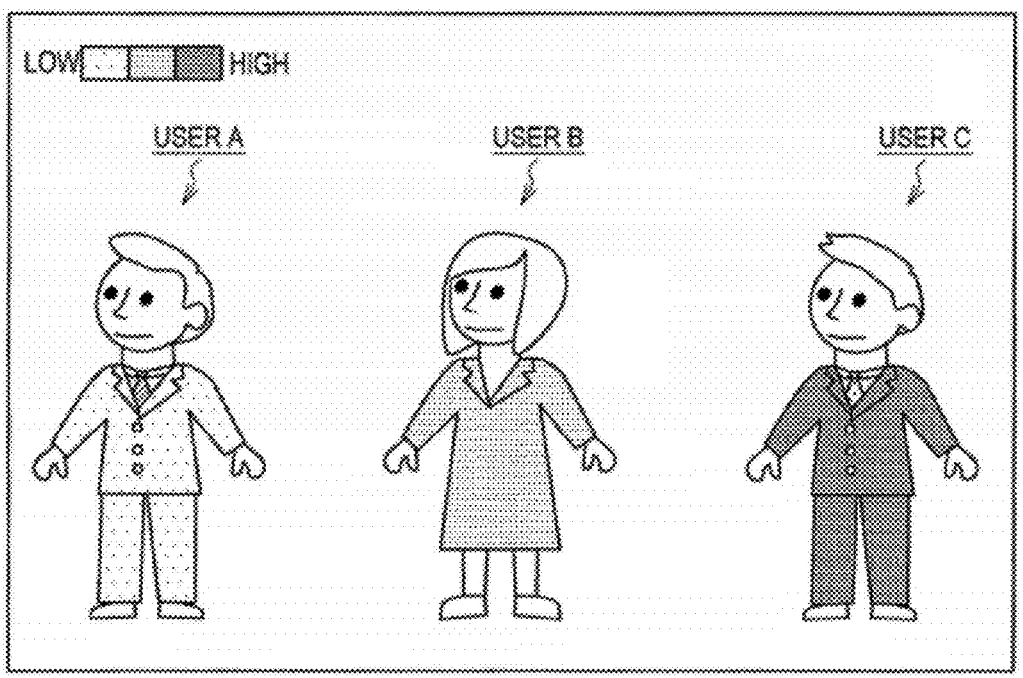
FIG. 17 is an explanatory diagram showing a seventh example of display data when the evaluation theme of "asset management" is specified in the information processing apparatus according to an embodiment of the present invention.

Next, an example of display data based on the securities constitution relative parameter (Z) according to an embodiment of the present invention will be shown. FIG. 17 is an explanatory diagram showing a seventh example of display data when the evaluation theme of "asset management" is specified in the information processing apparatus 100 according to an embodiment of the present invention. FIG. 17 shows an example of display data generated by the information processing apparatus 100 based on the securities constitution relative parameter (Z) being displayed in a display screen of a display apparatus. Also, FIG. 17 shows an example of display data based on the securities constitution relative parameter (Z) shown in FIG. 10.

As shown in FIG. 17, the display data generation part 112 generates display data in which evaluation images representing the ratio (securities holding ratio) occupied by securities balance to assets, for example, in accordance with the value of the securities constitution relative parameter (Z) by the color of clothing are combined. The ratio of securities balances to assets increases, as described above, with an increasing value of the securities constitution relative parameter (Z) and in the example in FIG. 10, the ratio of securities balance to assets is in the order of "user C>user B>user A". The display data generation part 112 can generate an evaluation image in which based on, for example, the order of the ratio occupied by securities balance to assets based on the securities constitution relative parameter (Z), the color of clothing is set (for example, the color of clothing is made darker or the predetermined color for the order is set to clothing) in accordance with the order of each, but not limited to the above method.

The information processing apparatus 100 generates, for example, display data from which images as shown FIG. 11 to FIG. 17 are displayed from relative evaluation parameters (the asset balance relative parameter (W), the asset fluctuation relative parameter (X), the asset variability relative parameter (Y), and the securities constitution relative parameter (Z)) of each of the user A to user C shown in FIG. 10. Therefore, the information processing apparatus 100 can represent relative relationships of information about assets of each of the user A to user C by visual information, that is, images.

As shown with reference to FIG. 2 to FIG. 17, when the evaluation theme of "asset management" is specified based on a display request, the information processing apparatus 100 derives relative evaluation parameters from history information corresponding to users whose display is requested by the display request for each user. Then, based on derived relative evaluation parameters, the information processing apparatus 100 generates display data from which an image showing relative relationships of information about assets of each user is displayed. Therefore, the information processing apparatus 100 can represent relative relationships of information about assets of each user indirectly by using visual information, that is, images, instead of values themselves of relative evaluation parameters derived based on history information.

[2] Second Example

When Evaluation Theme of "Exercise Amount" is Specified by Display Request

Next, concrete examples of various kinds of processing and generated display data when the evaluation theme of "exercise amount" is specified by a display request will be described.

(1-1) Derivation of Evaluation Index Values for Each User

After receiving a display request transmitted from a display apparatus, the information processing apparatus 100 reads corresponding history information from the storage part based on the evaluation theme specified by the display request and users whose display is requested by the display request. Here, readings of the history information from the storage part are made by the evaluation processing part 108.

FIG. 18 is an explanatory diagram illustrating an example of evaluation index values and content thereof when the evaluation theme of "exercise amount" is specified in the information processing apparatus 100 according to an embodiment of the present invention. When the evaluation theme of "exercise amount" is specified, as shown in FIG. 18, the information processing apparatus 100 derives, for example, two evaluation indexes of the exercise amount equalization index (N) and exercise amount dispersion index (O) as evaluation index values. The exercise amount equalization index (N) is an index to evaluate the magnitude of the exercise amount of a user and can be derived, for example, from an average value per unit period of a total metabolic rate in a predetermined period. The exercise amount dispersion index (O) is an index to evaluate the dispersion of exercise amount of a user per unit period and can be derived, for example, from the standard deviation of the total metabolic rate in a predetermined period.

As described above, the exercise amount equalization index (N) and exercise amount dispersion index (O) are derived, for example, from a total metabolic rate in a predetermined period of each user and the total metabolic rate is determined from history information. An example in which the predetermined period for deriving the exercise amount equalization index (N) and exercise amount dispersion index (O) is seven days and the unit period is one day is used below for a description of an embodiment that follows.

[Derivation Example of Total Metabolic Rate]

FIG. 19 is a second explanatory diagram exemplifying history information read based on the specified evaluation theme in the information processing apparatus 100 according to an embodiment of the present invention. Here, FIG. 19 shows history information when the evaluation processing part 108 extracts information such as health examination history information stored in the storage part, history information obtained from various sensors such as pulse sensor history information, acceleration sensor history information, and pedometer history information, behavior history information, and sports gym utilization history information.

First, the information processing apparatus 100 is not limited to directly using history information obtained from various sensors and, based on history information obtained from various sensors, can determine the type of behavior of a user by estimating the behavior type such as the sleep, rest (sitting position), standing position, walking speed, running speed, and car riding based on history information obtained from various kinds of sensors and the time needed for each type of behavior from the type of behavior of the user (behavior type estimation processing). For example, behavior types "sleep", "rest (sitting position)", and "walking" shown in FIG. 19 are estimated from history information obtained from a pulse sensor, acceleration sensor, pedometer, or myoelectric sensor.

While FIG. 19 shows history information of the user A who is one user specified by the display request, the evaluation processing part 108 can obtain history information having information similar to that in FIG. 19 regarding the users B and C who are other users specified by the display request from the storage part.

The evaluation processing part 108 derives the total metabolic rate in a predetermined period for each user from history information acquired from the storage part as shown in FIG. 19, standard information defined by basal metabolic rate standard values (FIG. 20A) for each age group, age coefficients (FIG. 20B), relative metabolic rates (RMR) (FIG. 20C) for each behavior type and the like as shown in FIG. 20A to FIG. 20C, and user specific information. Here, the user specific information is, for example, information such as the age, sex, weight and the like of the user. The evaluation processing part 108 can obtain the user specific information, for example, from health examination history information, but not limited to the above method. For example, the storage part may store the user specific information for each user so that the evaluation processing part 108 may read the user specific information from the storage part or from an external apparatus.

More specifically, the evaluation processing part 108 derives the total metabolic rate of each user for each unit period, for example, by means of Formula 10 shown below. Here, the sleeping metabolic rate is a metabolic rate while sleeping and is calculated by means of Formula 11 shown below. The resting metabolic rate is a metabolic rate while resting (a resting state while sitting at comfortable room temperature several hours after a meal) and is calculated by means of Formula 12 shown below. The kinetic metabolic rate is calculated by means of Formula 13 using the relative metabolic rate (RMR) specified for each behavior type. (Weight) in each of the Formulas 11 to 13 is in [kg], (sleeping time) is in [min], and n and m in Formula 13 are positive integers.

Total metabolic rate [kcal]=(sleeping metabolic rate)+ (resting metabolic rate)+(kinetic metabolic rate)  (Formula 10)

Sleeping metabolic rate [kcal]=(basal metabolic rate standard value)×0.9×(weight)×(sleeping time)  (Formula 11)

Resting metabolic rate [kcal]=(basal metabolic rate standard value)×1.2×(weight)×(sleeping time)  (Formula 12)

$$\text{kinetic metabolic rate[kcal]} = \sum_{n=1}^{m} (\text{basal metabolic rate standard value}) \times$$
$$(\{\text{age coefficients}\} \times RMR[n] + 1.2) \times$$
$$(\text{weight}) \times (\text{sleeping time})$$
[Formula 13]

FIG. 21 is an explanatory diagram exemplifying the total metabolic rate derived in the information processing apparatus 100 according to an embodiment of the present invention. FIG. 21 shows the total metabolic rate in the predetermined period (seven days) corresponding to the user A calculated using FIG. 19 and FIG. 20A to FIG. 20C. The evaluation processing part 108 can derive the total metabolic rate in the predetermined period (seven days) corresponding to the user A by performing operations shown in the above Formulas 10 to 13 based on the history information shown in FIG. 19, basic information as shown in FIG. 20A to FIG. 20C, and user specific information of the user A.

[Derivation of Exercise Amount Equalization Index (N) and Exercise Amount Dispersion Index (O)]

Figure 22:
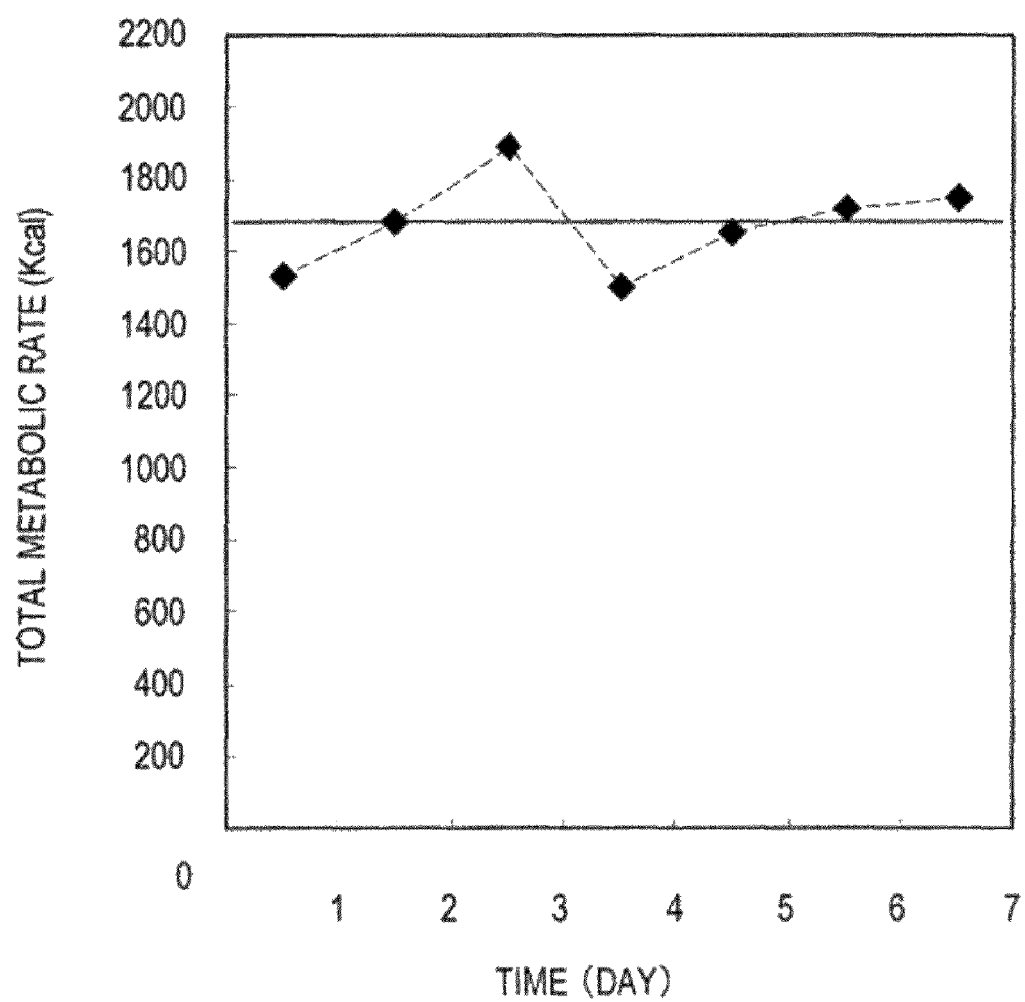
FIG. 22 is an explanatory diagram illustrating the derivation method of evaluation index values when the evaluation theme of "exercise amount" is specified in the information processing apparatus according to an embodiment of the present invention.

Next, the derivation method of the exercise amount equalization index (N) and exercise amount dispersion index (O) will be described. FIG. 22 is an explanatory diagram illustrating the derivation method of evaluation index values when the evaluation theme of "exercise amount" is specified in the information processing apparatus 100 according to an embodiment of the present invention. Here, FIG. 22 shows the total metabolic rate in the predetermined period (seven days) corresponding to the user A shown in FIG. 21 in graphical form.

[B-1] Exercise Amount Equalization Index (N)

The exercise amount equalization index (N) is, as described above, an index to evaluate the magnitude of the exercise amount of a user and can be derived, for example, from the average value per unit period of the total metabolic rate in a predetermined period. Therefore, the value of the exercise amount equalization index (N) in the case of FIG. 22 becomes "1634".

[B-2] Exercise Amount Dispersion Index (O)

The exercise amount dispersion index (O) is, as described above, an index to evaluate the dispersion of exercise amount of a user per unit period and can be derived, for example, from the standard deviation of the total metabolic rate in a predetermined period. Therefore, the value of the exercise amount dispersion index (O) in the case of FIG. 22 becomes "84".

The information processing apparatus 100 can derive the exercise amount equalization index (N) and exercise amount dispersion index (O), for example, by the derivation method shown in [B-1] and [B-2] respectively.

FIG. 23 is an explanatory diagram showing a derivation result of evaluation index values when the evaluation theme of "exercise amount" is specified in the information processing apparatus 100 according to an embodiment of the present invention, and shows evaluation index values (index numbers) derived based on the history information corresponding to the user A shown in FIG. 22. As shown in FIG. 23, the evaluation processing part 108 can derive the exercise amount equalization index "1634" and the exercise amount dispersion index "84" as evaluation index values corresponding to the user A when the evaluation theme of "exercise amount" is specified based on a display request.

(1-2) Derivation of Relative Evaluation Parameters Showing Relative Relationships Among Users The information processing apparatus 100 derives relative evaluation parameters showing relative relationships among users for each user based on evaluation index values derived in (1-1) described above for each user. Here, derivation of relative evaluation parameters is performed by the relative processing part 110.

FIG. 24A to FIG. 24C are explanatory diagrams illustrating the derivation method of relative evaluation parameters when the evaluation theme of "exercise amount" is specified in the information processing apparatus 100 according to an embodiment of the present invention. FIG. 24A exemplifies evaluation index values corresponding to the user A and is the same as FIG. 23. FIG. 24B exemplifies evaluation indexes corresponding to the user B derived by the derivation methods shown in [B-1] and [B-2] described above and FIG. 24C exemplifies evaluation indexes corresponding to the user C derived by the derivation methods shown in [B-1] and [B-2]. The derivation method of relative evaluation parameters when the evaluation theme of "exercise amount" is specified will be described below by taking an example of evaluation index values of the user A to user C shown in FIG. 24A to FIG. 24C respectively. Also, an example in which the relative processing part 110 derives an exercise amount equalization relative parameter (Y) corresponding to the exercise amount equalization index (N) shown in FIG. 24A to FIG. 24C and an exercise amount dispersion relative parameter (Z) corresponding to the exercise amount dispersion index (O) will be used below for a description of an embodiment that follows.

[b-1] Exercise Amount Equalization Relative Parameter (Y)

The relative processing part 110 derives exercise amount equalization relative parameters (Y: Ya, Yb, Yc) corresponding to each of the user A, user B, and user C by calculating an average value of the exercise amount equalization index from exercise amount equalization indexes (N: Na, Nb, Nc) of the user A, user B, and user C respectively and defining the calculated average value as a reference value (1.0). More specifically, the relative processing part 110 derives the exercise amount equalization relative parameters (Y: Ya, Yb, Yc)= (1.06, 1.05, 0.89), for example, by using Formula 14 to Formula 16 shown below. Here, the exercise amount equalization index (N) is an index to evaluate the magnitude of the exercise amount of a user and thus, an increasing value of the exercise amount equalization relative parameter (Y) indicates that the user does more exercise (the average value of the exercise amount being greater). Naturally, the derivation method of the exercise amount equalization relative parameter (Y) according to an embodiment of the present invention is not limited to the method using Formula 14 to Formula 16.

$$Ya = \frac{3Na}{Na + Nb + Nc}$$ [Formula 14]

$$Yb = \frac{3Nb}{Na + Nb + Nc}$$ [Formula 15]

$$Yc = \frac{3Nc}{Na + Nb + Nc}$$ [Formula 16]

[b-2] Exercise Amount Dispersion Relative Parameter (Z)

The relative processing part 110 derives exercise amount dispersion relative parameters (Z: Za, Zb, Zc) corresponding to each of the user A, user B, and user C by calculating an average value of the exercise amount dispersion index from exercise amount dispersion indexes (O: Oa, Ob, Oc) of the user A, user B, and user C respectively and defining the calculated average value as a reference value (1.0). More specifically, the relative processing part 110 derives the exercise amount dispersion relative parameters (Z: Za, Zb, Zc)= (0.71, 1.93, 0.34), for example, by using Formula 17 to Formula 19 shown below. Here, the exercise amount dispersion index (O) is an index to evaluate the dispersion of exercise amount per unit period of a user and thus, an increasing value of the exercise amount dispersion relative parameter (Z) greater than the reference value (1.0) indicates larger dispersion when exercise is done and a decreasing value smaller than the reference value (1.0) indicates more constant exercise. Naturally, the derivation method of the exercise amount dispersion relative parameter (Z) according to an embodiment of the present invention is not limited to the method using Formula 17 to Formula 19.

$$Za = \frac{3Oa}{Oa + Ob + Oc}$$ [Formula 17]

$$Zb = \frac{3Ob}{Oa + Ob + Oc}$$ [Formula 18]

$$Zc = \frac{3Oc}{Oa + Ob + Oc}$$ [Formula 19]

The information processing apparatus 100 can derive the exercise amount equalization relative parameter (Y) and exercise amount dispersion relative parameter (Z), for example, by the above derivation methods shown in [b-1] and [b-2].

FIG. 25 is an explanatory diagram showing a derivation result of relative evaluation parameters when the evaluation theme of "exercise amount" is specified in the information processing apparatus 100 according to an embodiment of the present invention and shows relative evaluation parameters (the exercise amount equalization relative parameter (Y) and exercise amount dispersion relative parameter (Z)) derived based on evaluation index values corresponding to the user A, user B, and user C shown in FIG. 24A to FIG. 24C. As shown in FIG. 25, the evaluation processing part 108 can derive the relative evaluation parameters corresponding to each of the user A, user B, and user C when the evaluation theme of "exercise amount" is specified based on a display request by the above derivation methods shown in [b-1] and [b-2].

(1-3/1-4) Generation of Evaluation Image/Generation of Display Data

The information processing apparatus 100 generates an evaluation image showing relative relationships among users regarding the evaluation theme for each user based on relative evaluation parameters for each user derived in (1-2) described above. Then, the information processing apparatus 100 generates, based on the evaluation image generated for each user, display data showing, for example, a combination of the evaluation images of each user or the evaluation image of each user and an additional image indicating relative relationships among users. Here, generation of an evaluation image is performed by the display data generation part 112.

Examples of display data when the evaluation theme of "exercise amount" is specified will be shown below by taking an example of relative evaluation parameters (the exercise amount equalization relative parameter (Y) and exercise amount dispersion relative parameter (Z)) of each of the user A to user C shown in FIG. 25. Also, both the exercise amount equalization relative parameter (Y) and exercise amount dispersion relative parameter (Z) will be used to show examples of display data in which relative relationships of information about the exercise amount of each of the user A to user C are represented. Similar to when the evaluation theme of "asset management" is specified, the information processing apparatus 100 according to an embodiment of the present invention can naturally generate display data in which relative relationships are represented for each relative evaluation parameter.

First Example

Figure 26:
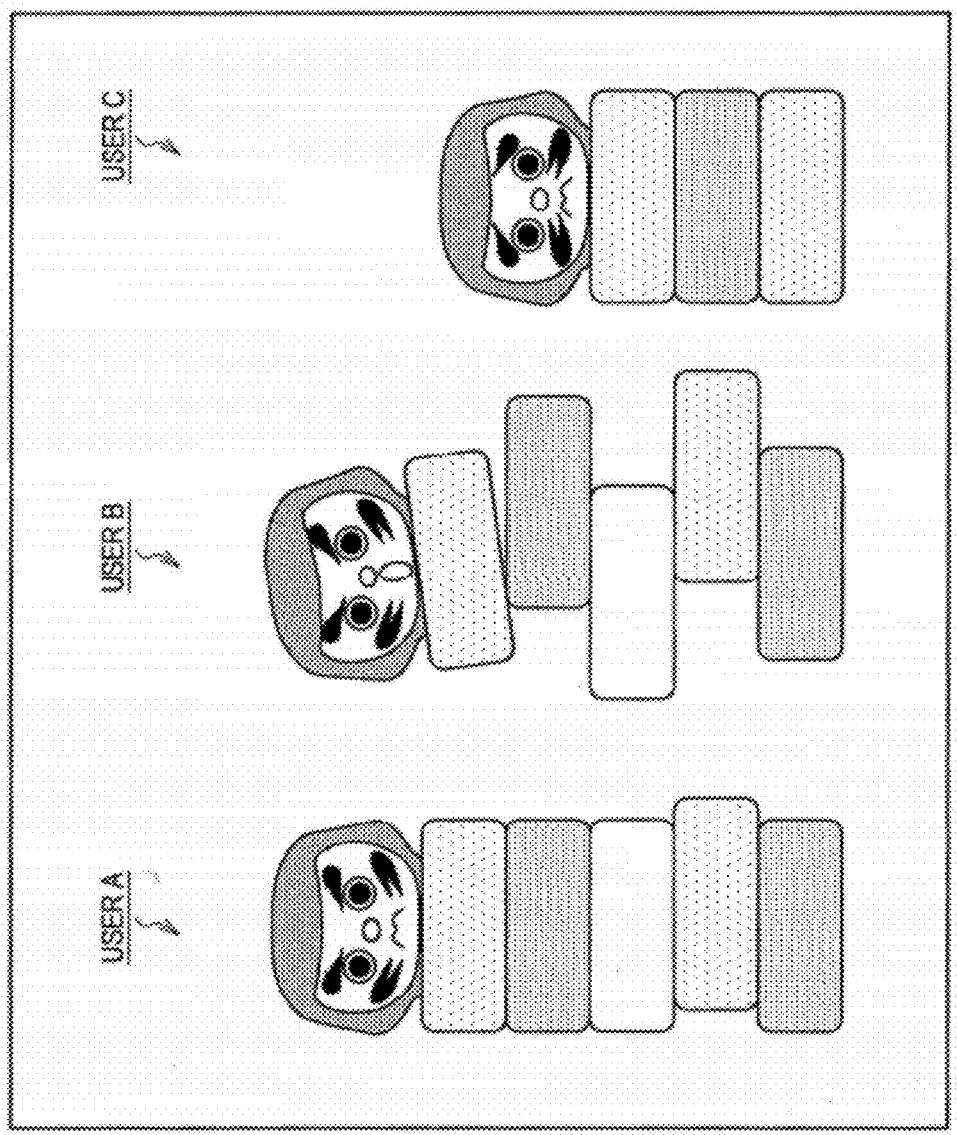
FIG. 26 is an explanatory diagram showing a first example of display data when the evaluation theme of "exercise amount" is specified in the information processing apparatus according to an embodiment of the present invention.

FIG. 26 is an explanatory diagram showing a first example of display data when the evaluation theme of "exercise amount" is specified in the information processing apparatus 100 according to an embodiment of the present invention.

FIG. 26 shows an example in which display data generated by the information processing apparatus 100 based on the exercise amount equalization relative parameter (Y) and exercise amount dispersion relative parameter (Z) being displayed in a display screen of a display apparatus. FIG. 26 also shows an example of display data in which relative relationships of information about the exercise amount are shown by a daruma toy based on the exercise amount equalization relative parameter (Y) and exercise amount dispersion relative parameter (Z) shown in FIG. 25.

[Exercise Amount Equalization Relative Parameter (Y)]

The display data generation part 112 generates display data in which evaluation images representing an average value of exercise amount by the height of seating of the daruma being changed, for example, in accordance with the value of the exercise amount equalization relative parameter (Y) are combined. Here, the display data generation part 112 can generate an evaluation image in which the height of seating in accordance with the value of the exercise amount equalization relative parameter (Y) of each user is set, for example, by referencing a Look-up Table in which the value of the exercise amount equalization relative parameter M) and the height of seating are associated, but not limited to the above method.

The display data generation part 112 also determines whether or not the value of, for example, the exercise amount equalization relative parameter (Y) is equal to or greater than the reference value (1.0) or smaller than the reference value (1.0), and generates display data in which evaluation images having the expression of the daruma changed in accordance with the determination result are combined. Here, if the value of the exercise amount equalization relative parameter (Y) is smaller than the reference value (1.0), there is a high probability that the exercise amount of the user is smaller than that of other users. Therefore, if the value of the exercise amount equalization relative parameter (Y) is smaller than the reference value (1.0), the display data generation part 112 sets, for example, like the user C shown in FIG. 26, the expression of the daruma to that showing sorrow. Naturally, the expression of the daruma set by the display data generation part 112 based on the value of the exercise amount equalization relative parameter (Y) and the reference value (1.0) is not limited to that of sorrow.

[Exercise Amount Dispersion Relative Parameter (Z)]

The display data generation part 112 generates display data in which evaluation images representing dispersion of exercise amount by the stability of seating of the daruma being changed in accordance with the value of the exercise amount dispersion relative parameter (Z) are combined. Here, the display data generation part 112 can generate an evaluation image in which the stability of seating in accordance with the value of the exercise amount dispersion relative parameter (Z) of each user is set, for example, by referencing a Look-up Table in which the value of the exercise amount dispersion relative parameter (Z) and the stability of seating are associated, but not limited to the above method.

The display data generation part 112 also determines whether or not the value of, for example, the exercise amount dispersion relative parameter (Z) is equal to or greater than the reference value (1.0) or smaller than the reference value (1.0), and generates display data in which evaluation images having the expression of the daruma changed in accordance with the determination result are combined. Here, if the value of the exercise amount dispersion relative parameter (Z) is greater than the reference value (1.0), there is a high probability that the dispersion of the user is larger than that of other users when doing exercise. Therefore, if the value of the value of the exercise amount dispersion relative parameter (Z) is greater than the reference value (1.0), the display data generation part 112 sets, for example, the expression of the daruma to that showing surprise. Naturally, the expression of the daruma set by the display data generation part 112 based on the value of the exercise amount dispersion relative parameter (Z) and the reference value (1.0) is not limited to that of surprise. If the value of the exercise amount equalization relative parameter (Y) is smaller than the reference value (1.0) and that of the exercise amount dispersion relative parameter (Z) is greater than the reference value (1.0), the display data generation part 112 can set the expression of the daruma, for example, based on a preset order of preference, but not limited to the above method.

As shown in FIG. 26, the display data generation part 112 can represent relative relationships of information about the exercise amount of the user A to user C by relative relationships of information about the exercise amount being represented by a daruma toy based on the exercise amount equalization relative parameter (Y) and exercise amount dispersion relative parameter (Z).

Second Example

Figure 27:
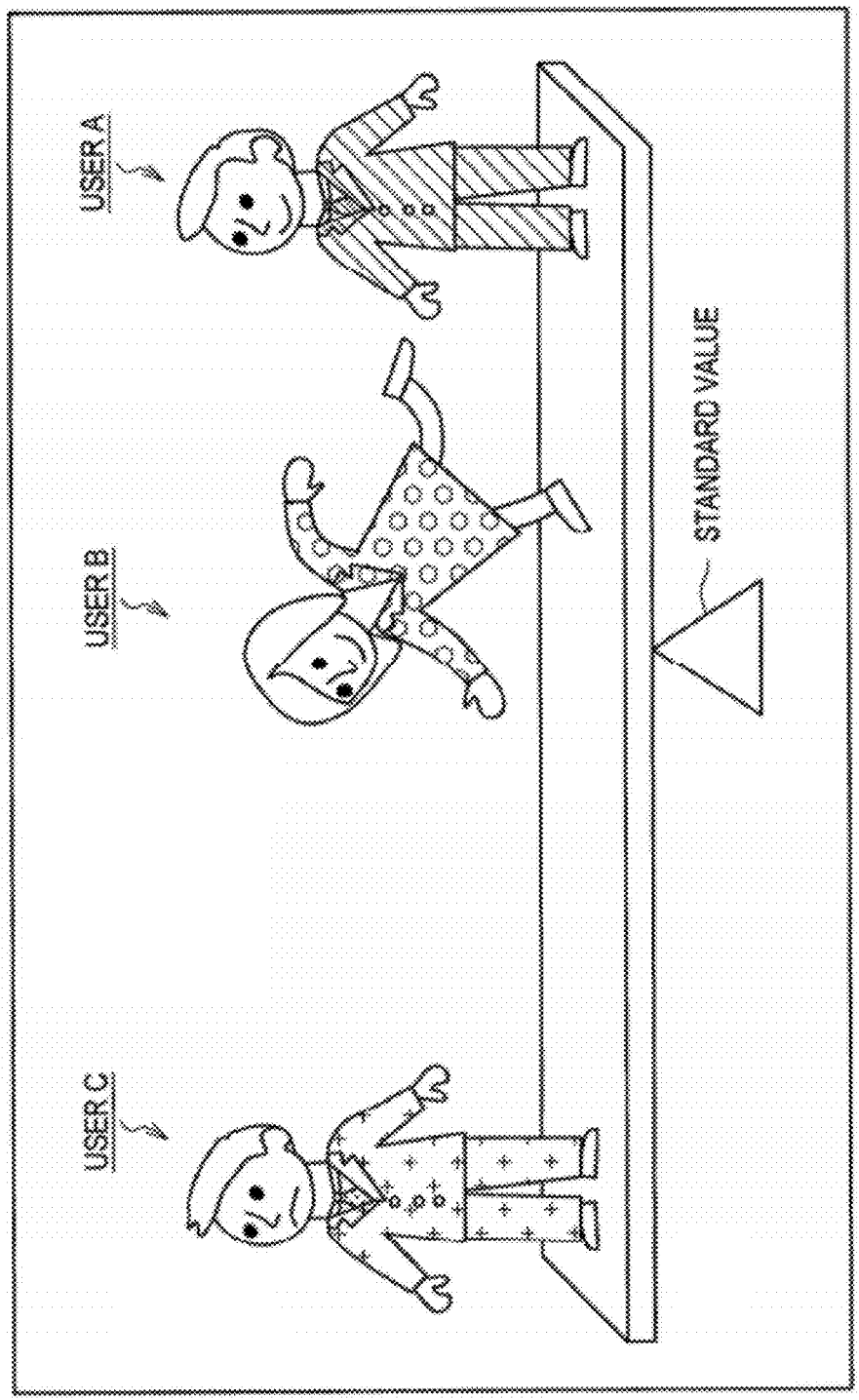
FIG. 27 is an explanatory diagram showing a second example of display data when the evaluation theme of "exercise amount" is specified in the information processing apparatus according to an embodiment of the present invention.

In the first example shown in FIG. 26, relative relationships of information about the exercise amount are represented by a daruma toy. However, the mode of representation of relative relationships of information about the exercise amount according to an embodiment of the present invention is not limited to the example shown in FIG. 26. FIG. 27 is an explanatory diagram showing a second example of display data when the evaluation theme of "exercise amount" is specified in the information processing apparatus 100 according to an embodiment of the present invention. Here, FIG. 27 shows the second example of display data generated by the information processing apparatus 100 based on the exercise amount equalization relative parameter (Y) and exercise amount dispersion relative parameter (Z) being displayed in a display screen of a display apparatus. FIG. 27 also shows an example of display data based on the exercise amount equalization relative parameter (Y) and exercise amount dispersion relative parameter (Z) shown in FIG. 25 and, like FIG. 11 and FIG. 12, shows relative relationships with a seesaw.

[Exercise Amount Equalization Relative Parameter (Y)]

The display data generation part 112 generates display data in which an evaluation image of each user is arranged in accordance with the value of the exercise amount equalization relative parameter (Y) with respect to an additional image in which, for example, the reference value (1.0) is set as the fulcrum of a seesaw. More specifically, the display data generation part 112 determines the distance from the fulcrum, for example, based on the value of an absolute value obtained as a difference between the value of the exercise amount equalization relative parameter (Y) of each user and the reference value (1.0). If the value of the exercise amount equalization relative parameter (Y) is smaller than the reference value (1.0), the display data generation part 112 arranges an evaluation image, for example, to the left of the fulcrum and if the value of the exercise amount equalization relative parameter (Y) is greater than the reference value (1.0), the display data generation part 112 arranges an evaluation image to the right of the fulcrum. By arranging an evaluation image of each user on the seesaw, as described above, the display data generation part 112 can represent relative relationships of information about the exercise amount using the distance from the fulcrum and whether being arranged to the left or to the right.

The display data generation part 112 also determines whether the value of the exercise amount equalization relative parameter (Y) is equal to or greater than the reference value (1.0) or smaller than the reference value (1.0) so that the expression can be changed in accordance with the determination result. If, for example, the value of the exercise amount equalization relative parameter (Y) is greater than the reference value (1.0), the display data generation part 112 can set, like the user A and user B shown in FIG. 27, the expression to a smiling face, but not limited to the above expression. By the expression being set as described above, the display data generation part 112 can visually represent information whether or not being greater than the reference value (1.0).

[Exercise Amount Dispersion Relative Parameter (Z)]

The display data generation part 112 generates display data in which evaluation images representing the degree of stability of the exercise amount (that is, whether exercise is done constantly), for example, in accordance with the value of the exercise amount dispersion relative parameter (Z) by a pose are combined. A smaller value of the exercise amount dispersion relative parameter (Z) than the reference value (1.0) indicates, as described above, that the user steadily does exercise. Here, in the case of FIG. 25, the value of the exercise amount dispersion relative parameter (Z) corresponding to the user B is greater than the reference value (1.0), which indicates that exercise amounts done by the user B vary greatly. Therefore, the display data generation part 112 visually represents that exercise amounts done by the user B vary greatly by setting, for example, an image showing an unstable pose as an evaluation image corresponding to the user B. While an example in which the pose of an evaluation image showing the user A and that of an evaluation image showing the user C are the same is shown in FIG. 27, the pose is not limited to the above example and the display data generation part 112 can also set a more stable pose with a decreasing value of the exercise amount dispersion relative parameter (Z).

The information processing apparatus 100 generates display data from which an image as shown, for example, in FIG. 26 or FIG. 27 is displayed from relative evaluation parameters (the exercise amount equalization relative parameter (Y) and exercise amount dispersion relative parameter (Z)) of each of the user A to user C shown in FIG. 25. Therefore, the information processing apparatus 100 can represent relative relationships of information about the exercise amount of each of the user A to user C as visual information, that is, images. Naturally, the mode of representation of relative relationships of information about the exercise amount of each of the user A to user C is not limited to the example shown in FIG. 26 or FIG. 27.

As shown with reference to FIG. 18 to FIG. 27, when the evaluation theme of "exercise amount" is specified based on a display request, the information processing apparatus 100 derives relative evaluation parameters from history information corresponding to users whose display is requested by the display request for each user. Then, based on derived relative evaluation parameters, the information processing apparatus 100 generates display data from which an image showing relative relationships of information about the exercise amount of each user is displayed. Therefore, the information processing apparatus 100 can represent relative relationships of information about the exercise amount of each user indirectly by using visual information, that is, images, instead of values themselves of relative evaluation parameters derived based on history information.

Third Example

When Evaluation Theme of "Diet" is Specified by Display Request

Next, concrete examples of various kinds of processing and generated display data when the evaluation theme of "diet" is specified by a display request will be described.

(1-1) Derivation of Evaluation Index Values for Each User

After receiving a display request transmitted from a display apparatus, the information processing apparatus 100 reads corresponding history information from the storage part based on the evaluation theme specified by the display request and users whose display is requested by the display request. Here, readings of the history information from the storage part are made by the evaluation processing part 108.

When the evaluation theme of "diet" is specified, the information processing apparatus 100 calculates the calorie balance of each user using the total metabolic rate used when the evaluation theme of "exercise amount" is specified and a total intake. Here, the information processing apparatus 100 can determine the total intake by estimation using, for example, meal history information.

Then, based on the calculated calorie balance, the information processing apparatus 100 derives two evaluation indexes of "calorie balance index (N)" and "calorie dispersion index (O)" as evaluation index values. Here, the calorie balance index (N) is an index to evaluate which of the amount of calorie taken in by a user and that consumed is larger and can be derived, for example, from an average value per unit period of the calorie balance in a predetermined period. The calorie dispersion index (O) is an index to evaluate dispersion of calorie balances per unit period of a user and can be derived, for example, from the standard deviation of calorie balance in a predetermined period.

As described above, the calorie balance index (N) and calorie dispersion index (O) are derived, for example, from a calorie balance in a predetermined period of each user and the calorie balance is determined from history information. Similar to when the evaluation theme of "exercise amount" is specified, an example in which the predetermined period for deriving the calorie balance index (N) and calorie dispersion index (O) is seven days and the unit period is one day is used below for a description of an embodiment that follows.

FIG. 28 is a third explanatory diagram exemplifying history information read based on the specified evaluation theme in the information processing apparatus 100 according to an embodiment of the present invention, showing history information for each of the user A, user B, and user C.

Here, like when the evaluation theme of "exercise amount" is specified, the total metabolic rate shown in FIG. 28 is derived by the evaluation processing part 108 using health examination history information, history information obtained from various sensors such as pulse sensor history information, acceleration sensor history information, and pedometer history information, behavior history information, and sports gym utilization history information.

The total intake shown in FIG. 28 is derived by the evaluation processing part 108 using information about what a user has eaten obtained from meal menu history information and standard food calorie information in which calories are calculated for each type of food in advance. Here, the evaluation processing part 108 can derive the total intake, for example, by appropriately reading standard food calorie information stored in the storage part in advance, but not limited to the above method. For example, the evaluation processing part 108 can derive the total intake by acquiring standard food calorie information from an external apparatus. Naturally, the derivation method of the total intake according to an embodiment of the present invention is not limited to the above method.

Based on the total metabolic rate and total intake derived as described above, the evaluation processing part 108 calculates the calorie balance ("Balance" in FIG. 28). More specifically, the evaluation processing part 108 calculates the calorie balance, for example, by means of Formula 20 shown below. Here, FIG. 28 shows an example, in which calorie balances are calculated by means of Formula 20.

Calorie balance=(total intake)−(total metabolic rate)　　(Formula 20)

Next, the derivation method of the calorie balance index (N) and calorie dispersion index (O) will be described.

[C-1] Calorie Balance Index (N)

The calorie balance index (N) is, as described above, an index to evaluate which of the amount of calorie taken in by a user and that consumed is larger and can be derived, for example, from an average value per unit period of the calorie balance in a predetermined period. Therefore, the calorie balance index in the case of FIG. 28 is obtained as (N: Na, Nb, Nc)=(53, 56, 146). Here, FIG. 28 shows an example in which the calorie balance is calculated by means of Formula 20 and thus, the sign "positive" of the calorie balance index (N) indicates that the calorie intake is larger than the amount of consumption and the sign "negative" of the calorie balance index (N) indicates that amount of consumption is larger than the calorie intake. That is, the sign "positive" of the calorie balance index (N) is not a good result in terms of diet.

[C-2] Calorie Dispersion Index (O)

The calorie dispersion index (O) is, as described above, an index to evaluate dispersion of calorie balances per unit period of a user and can be derived, for example, from the standard deviation of calorie balance in a predetermined period. Therefore, the calorie dispersion index in the case of FIG. 28 is obtained as (O: Oa, Ob, Oc)=(119, 201, 37).

The information processing apparatus 100 can derive the calorie balance index (N) and calorie dispersion index (O), for example, by the above derivation methods shown in [C-1] and [C-2].

FIG. 29 is an explanatory diagram showing a derivation result of evaluation index values when the evaluation theme of "diet" is specified in the information processing apparatus 100 according to an embodiment of the present invention. As shown in FIG. 29, the evaluation processing part 108 can derive the calorie balance index (53, 56, 146) and the calorie dispersion index (119, 201, 37) corresponding to the user A to user C based on the history information shown in FIG. 28 when the evaluation theme of "diet" is specified based on a display request.

(1-2) Derivation of Relative Evaluation Parameters Showing Relative Relationships Among Users The information processing apparatus 100 derives relative evaluation parameters showing relative relationships among users for each user based on evaluation index values derived in (1-1) described above for each user. Here, derivation of relative evaluation parameters is performed by the relative processing part 110. The derivation method of relative evaluation parameters will be described below when the evaluation theme of "diet" is specified by taking an example of evaluation index values of each of the user A to user C shown in FIG. 29. Also, an example in which the relative processing part 110 derives a calorie balance relative parameter (Y) corresponding to the calorie balance index (N) shown in FIG. 29 and a calorie dispersion relative parameter (Z) corresponding to the calorie dispersion index (O) will be used below for a description of an embodiment that follows.

[c-1] Calorie Balance Relative Parameter (Y)

The relative processing part 110 derives calorie balance relative parameters (Y: Ya, Yb, Yc) corresponding to each of the user A, user B, and user C by calculating an average value of the calorie balance index from calorie balance indexes (N: Na, Nb, Nc) of the user A, user B, and user C respectively and defining the calculated average value as a reference value (1.0). More specifically, the relative processing part 110 derives the calorie balance relative parameters (Y: Ya, Yb, Yc)=(0.63, 0.66, 1.71), for example, by using Formula 21 to Formula 23 shown below. Here, an increasing value of the calorie balance relative parameter (Y) greater than the reference value (1.0) indicates that the amount of calorie taken in is larger than that consumed. Naturally, the derivation method of the calorie balance relative parameter (Y) according to an embodiment of the present invention is not limited to the method using Formula 21 to Formula 23.

$$Ya = \frac{3Na}{Na + Nb + Nc}$$　　[Formula 21]

$$Yb = \frac{3Nb}{Na + Nb + Nc}$$　　[Formula 22]

$$Yc = \frac{3Nc}{Na + Nb + Nc}$$　　[Formula 23]

[c-2] Calorie Dispersion Relative Parameter (Z)

The relative processing part 110 derives calorie dispersion relative parameters (Z: Za, Zb, Zc) corresponding to each of the user A, user B, and user C by calculating an average value of the calorie dispersion index from calorie dispersion indexes (O: Oa, Ob, Oc) of the user A, user B, and user C respectively and defining the calculated average value as a reference value (1.0). More specifically, the relative processing part 110 derives the calorie dispersion relative parameters (Z: Za, Zb, Zc)=(1.00, 1.69, 0.31), for example, by using Formula 24 to Formula 26 shown below. Here, the calorie dispersion index (O) is an index to evaluate the dispersion of calorie per unit period of a user and thus, an increasing value of the calorie dispersion relative parameter (Z) greater than the reference value (1.0) indicates larger dispersion of difference between the calorie intake and amount of consumption and a decreasing value smaller than the reference value (1.0) indicates that the calorie intake and the amount of consumption move closer. Naturally, the derivation method of the calorie dispersion relative parameter (Z) according to an embodiment of the present invention is not limited to the method using Formula 24 to Formula 26.

$$Za = \frac{3Oa}{Oa + Ob + Oc}$$　　[Formula 24]

$$Zb = \frac{3Ob}{Oa + Ob + Oc}$$　　[Formula 25]

$$Zc = \frac{3Oc}{Oa + Ob + Oc}$$　　[Formula 26]

The information processing apparatus 100 can derive the calorie balance relative parameter (Y) and calorie dispersion relative parameter (Z), for example, by the above derivation methods shown in [c-1] and [c-2].

FIG. 30 is an explanatory diagram showing a derivation result of relative evaluation parameters when the evaluation theme of "diet" is specified in the information processing apparatus 100 according to an embodiment of the present invention, and shows relative evaluation parameters (the calorie balance relative parameter (Y) and calorie dispersion relative parameter (Z)) derived based on evaluation index values corresponding to the user A, user B, and user C shown in FIG. 29. As shown in FIG. 30, the evaluation processing part 108 can derive relative evaluation parameters corresponding to each of the user A, user B, and user C when the evaluation theme of "diet" is specified based on a display request by the above derivation method shown in [c-1] and [c-2].

(1-3/1-4) Generation of Evaluation Image/Generation of Display Data

The information processing apparatus 100 generates an evaluation image showing relative relationships among users regarding the evaluation theme for each user based on relative evaluation parameters for each user derived in (1-2) described above. Then, the information processing apparatus 100 generates, based on the evaluation image generated for each user, display data showing, for example, a combination of the evaluation images of each user or the evaluation image of each user and an additional image indicating relative relationships among users. Here, generation of an evaluation image is performed by the display data generation part 112.

Examples of display data when the evaluation theme of "diet" is specified will be shown below by taking an example of relative evaluation parameters (the calorie balance relative parameter (Y) and calorie dispersion relative parameter (Z)) of each of the user A to user C shown in FIG. 30. Also, both the calorie balance relative parameter (Y) and calorie dispersion relative parameter (Z) will be used to show examples of display data in which relative relationships of information about calorie of each of the user A to user C are represented. Similar to when the evaluation theme of "asset management" is specified, the information processing apparatus 100 according to an embodiment of the present invention can naturally generate display data in which relative relationships are represented for each relative evaluation parameter.

Figure 31:
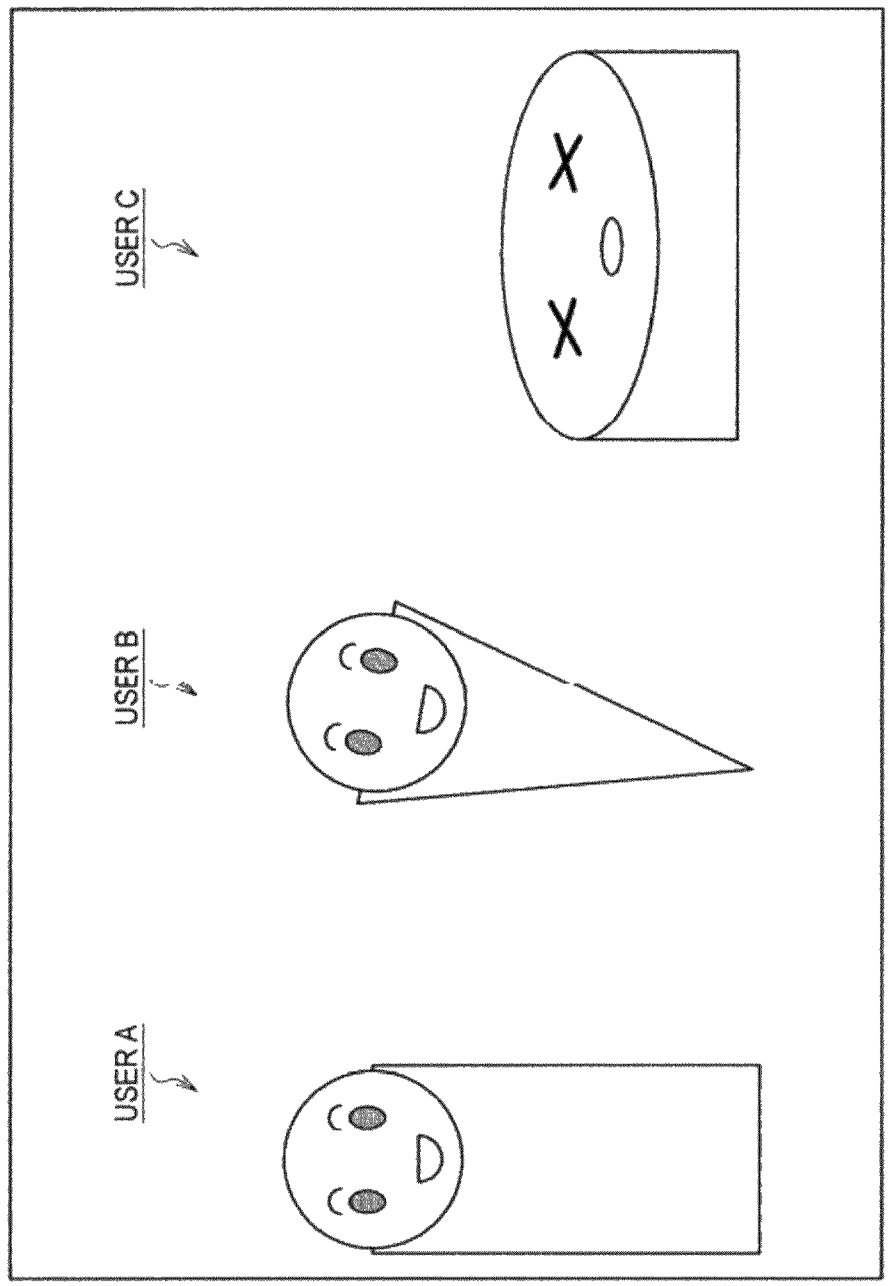
FIG. 31 is an explanatory diagram showing an example of display data when the evaluation theme of "diet" is specified in the information processing apparatus according to an embodiment of the present invention.

FIG. 31 is an explanatory diagram showing an example of display data when the evaluation theme of "diet" is specified in the information processing apparatus 100 according to an embodiment of the present invention. FIG. 31 shows an example of display data generated by the information processing apparatus 100 based on the calorie balance relative parameter (Y) and calorie dispersion relative parameter (Z) being displayed in a display screen of a display apparatus. FIG. 31 also shows an example of display data in which relative relationships of information about the calorie balance are shown based on the calorie balance relative parameter (Y) and calorie dispersion relative parameter (Z) shown in FIG. 30.

[Calorie Balance Relative Parameter (Y)]

The display data generation part 112 generates display data in which evaluation images representing an average value of calorie balances by the aspect ratio of a graphic being set, for example, in accordance with the value of the calorie balance relative parameter (Y) are combined. Here, the display data generation part 112 can generate an evaluation image in which the aspect ratio in accordance with the value of the calorie balance relative parameter (Y) of each user is set, for example, by referencing a Look-up Table in which the value of the calorie balance relative parameter (Y) and the aspect ratio are associated, but not limited to the above method.

The display data generation part 112 also determines whether or not the value of, for example, the calorie balance relative parameter (Y) is equal to or greater than the reference value (1.0) or smaller than the reference value (1.0) so that the expression can be changed in accordance with the determination result. If, for example, the value of the calorie balance relative parameter (Y) is greater than the reference value (1.0), the display data generation part 112 can set, like the user C shown in FIG. 31, the expression to that of sorrow, but not limited to the above expression. By the expression being set as described above, the display data generation part 112 can visually represent information whether or not being greater than the reference value (1.0).

[Calorie Dispersion Relative Parameter (Z)]

The display data generation part 112 generates display data in which evaluation images representing the degree of stability of the calorie balance (that is, whether the calorie intake and the amount of consumption are balanced), for example, in accordance with the value of the calorie dispersion relative parameter (Z) by stability of a graphic (for example, represented by base area) are combined. Here, a decreasing value of the calorie dispersion relative parameter (Z) smaller than the reference value (1.0) indicates that the calorie balance of a user is more stable. In the case of FIG. 30, the value of the calorie dispersion relative parameter (Z) corresponding to the user B is greater than the reference value (1.0), which indicates that daily (per unit period) calorie balance results of the user B are unstable. Therefore, the display data generation part 112 visually represents that the calorie balance is unstable by setting, for example, an image having a small base area as an evaluation image corresponding to the user B. The display data generation part 112 can generate an evaluation image in which the aspect ratio in accordance with the value of the calorie dispersion relative parameter (Z) of each user is set by using Look-up Table in which the value of the calorie dispersion relative parameter (Z) and the base area are associated, but not limited to the above method.

The information processing apparatus 100 generates display data from which, for example, an image as shown in FIG. 31 is displayed from relative evaluation parameters (calorie balance relative parameter (Y) and calorie dispersion relative parameter (Z)) of each of the user A to user C shown in FIG. 30. Therefore, the information processing apparatus 100 can represent relative relationships of information about the calorie balance of each of the user A to user C by visual information, that is, images. Naturally, the mode of representation of relative relationships of information about the calorie balance of each of the user A to user C is not limited to the example shown in FIG. 31.

As shown with reference to FIG. 28 to FIG. 31, when the evaluation theme of "diet" is specified based on a display request, the information processing apparatus 100 derives relative evaluation parameters from history information corresponding to users whose display is requested by the display request for each user. Then, based on derived relative evaluation parameters, the information processing apparatus 100 generates display data from which an image showing relative relationships of information about the calorie balance of each user is displayed. Therefore, the information processing apparatus 100 can represent relative relationships of information about the calorie balance of each user indirectly by using visual information, that is, images, instead of values themselves of relative evaluation parameters derived based on history information.

As described above by taking examples of three evaluation themes "asset management", "exercise amount", and "diet", the information processing apparatus 100 according to an embodiment of the present invention can represent relative relationships of information of each user in accordance with each evaluation theme indirectly by using visual information, that is, images, instead of values themselves of relative evaluation parameters derived based on history information by performing the above processing in (1-1) to (1-4).

The information processing apparatus 100 transmits generated display data to an origin device (for example, a display apparatus) of the display request to cause the device to display an image set by the display data by the above processing in (2). Therefore, the information processing apparatus 100 can cause an unspecified number of people to share relative information among a plurality of users based on history information while keeping users' privacy.

In the foregoing, three evaluation themes of "asset management", "exercise amount", and "diet" are used as examples for a description of an embodiment, evaluation themes according to embodiment of the present invention are not limited to the above examples. For example, the information processing apparatus 100 can use history information of sleep, health, study, learning and so on collected by a so-called lifelog to indirectly represent relative relationships among users on various evaluation themes using visual information, that is, images.

In the foregoing, three users of the user A, user B, and user C are used as examples for a description of an embodiment, but users are not limited to the above case and the information processing apparatus 100 can generate display data in which relative information among any number of at least two users is represented. The information processing apparatus 100 can also make, for example, the population used for deriving relative parameters larger than the number of users displayed in display data (that is, (number of users from whom evaluation index values are derived)>(number of users displayed in display data)). According to the foregoing, the information processing apparatus 100 can represent relative relationships among users displayed in display data (that is, users whose display is requested by a display request) using relative parameters of higher reliability.

Further, examples in which relative relationships among users are represented by still images are shown in FIG. 11 to FIG. 17, FIG. 26, FIG. 27, and FIG. 31, but images are not limited to the above examples and the information processing apparatus 100 may represent relative relationships among users, for example, by animation.

Next, an information providing system according to an embodiment of the present invention and the configuration of the information processing apparatus 100 will be described more specifically.

(Information Providing System According to an Embodiment of the Present Invention)

Figure 32:
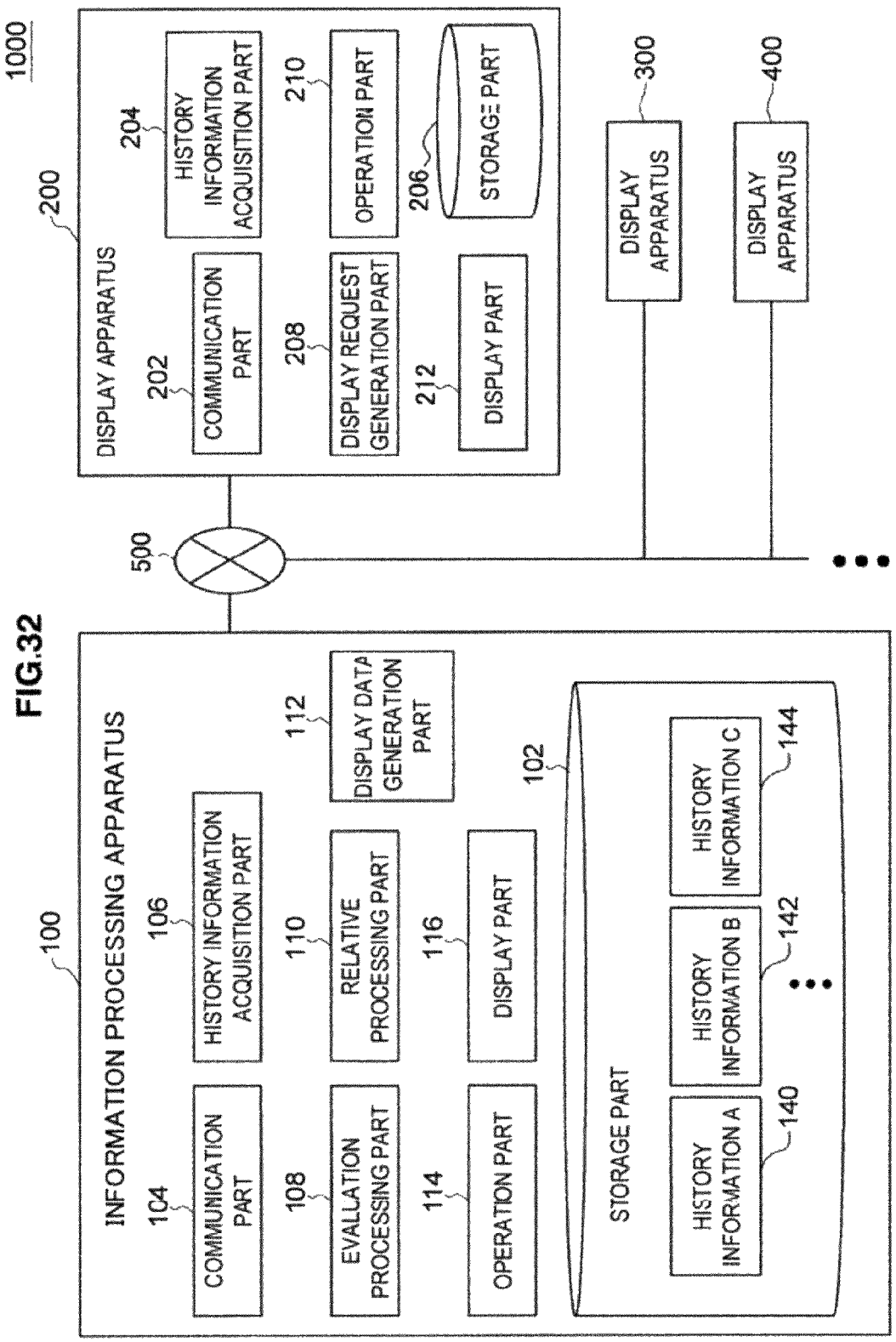
FIG. 32 is a block diagram showing an information providing system according to an embodiment of the present invention.

FIG. 32 is a block diagram showing an information providing system 1000 according to an embodiment of the present invention. Referring to FIG. 32, the information providing system 1000 has display apparatuses 200, 300, and 400 and the information processing apparatus 100. The information processing apparatus 100 and each display apparatus are connected via a network 500. Though not shown in FIG. 32, the information processing apparatus 100 can also acquire various kinds of history information by performing communication with an external apparatus such as a server owned by a company issuing credit cards, a server owned by a hospital, and a server owned by a bank.

Here, the network 500 includes, for example, a wire network such as a LAN (Local Area Network) and WAN (Wide Area Network), a wireless network such as a WLAN (Wireless Local Area Network) using MIMO (Multiple-Input Multiple-Output), and the Internet using a communication protocol such as TCP/IP (Transmission Control Protocol/Internet Protocol), but not limited to the above examples. The information processing apparatus 100 and each display apparatus may be connected, for example, via a wireless station.

[Display Apparatus 200, 300, 400, . . . ]

Each of the display apparatuses 200, 300, 400, . . . has a communication part 202, a history information acquisition part 204, a storage part 206, a display request generation part 208, an operation part 210, and a display part 212.

Each of the display apparatuses 200, 300, 400, . . . may also have a control part (not shown) constituted by an MPU (Micro Processing Unit) or the like to perform various arithmetic processing using a control program or the like to control the whole display apparatus, a ROM (not shown) in which control data such as programs and arithmetic parameters used by the control part, and a RAM (not shown) used for primary storage of programs and the like executed by the control part. Each of the display apparatuses 200, 300, 400, . . . connects each component, for example, by a bus used as a transmission path of data. The display apparatus 200 will be taken as an example below to describe each component of the display apparatus constituting the information providing system 1000.

The communication part 202 performs communication with the information processing apparatus 100 and the like via the network 500. More specifically, the communication part 202 transmits, for example, a display request to the information processing apparatus 100 and receives display data transmitted from the information processing apparatus 100 in response to the display request. The communication part 202 can also transmit history information acquired by the history information acquisition part 204 to the information processing apparatus 100.

The history information acquisition part 204 includes, for example, a sensor part having a sensor such as a pulse sensor, acceleration sensor, pedometer, and myoelectric sensor and a processing part constituted by an MPU or the like to perform processing, and the history information acquisition part 204 acquires information about body information and behavior of the user using the display apparatus 200. Then, the history information acquisition part 204 records the acquired information, for example, in the storage part 206 as history information. The history information acquisition part 204 also transmits, for example, the acquired history information (or history information stored in the storage part 206) and user ID identifying the user to the information processing apparatus 100 via the communication part 202 in response to a history information acquisition request from the information processing apparatus 100.

The history information acquisition part 204 is not limited to transmitting history information in response to the history information acquisition request and can transmit information, for example, at any time or periodically/non-periodically to the information processing apparatus 100 via the communication part 202. Here, the history information acquisition part 204 stores, for example, information about a specific IP address indicating the information processing apparatus 100 in advance and can transmit history information to the information processing apparatus 100 using information about the IP address, but not limited to the above method.

The storage part 206 is a storage unit provided with the display apparatus 200. For example, user history information acquired by the history information acquisition part 204, display data provided by the information processing apparatus 100 and various applications are stored in the storage part 206.

The storage part 206 includes, for example, a magnetic recording medium such as a hard disk and a nonvolatile memory such as a flash memory, but not limited to the above examples.

The display request generation part 208 is constituted, for example, by an MPU or the like and generates a display request having information such as a plurality of user IDs whose display of relative information is desired and device identification information for identify the display apparatus (such as the IP address and MAC address) to cause the communication part 202 to transmit the generated display request.

The operation part 210 is an operation unit of the display apparatus 200 enabling the user to perform predetermined operations. With the operation part 210 being provided, the display apparatus 200 enables, for example, selection of the evaluation theme and that of users to be displayed in the screen for display data so that the display request generation part 208 can generate a display request in accordance with user operations or cause the display apparatus 200 to perform an operation desired by the user.

Here, the operation part 210 includes, for example, an operation input device such as a keyboard and mouse, a rotating selector such as a button, direction key, and jog dial, or a combination of these, but not limited to the above examples.

The display part 212 displays an image indicating display data received by the communication part 202. Here, the display part 212 includes, for example, an LCD (Liquid Crystal Display) and organic EL display (organic ElectroLuminescence display, also called an OLED display (Organic Light Emitting Diode display)), but not limited to the above examples.

Each of the display apparatuses 200, 300, 400, . . . can transmit a display request to the information processing apparatus 100 and receive and display display data transmitted from the information processing apparatus 100 in response to the display request by having the above constitution.

[Information Processing Apparatus 100]

Next, the information processing apparatus 100 according to an embodiment of the present invention will be described.

The information processing apparatus 100 includes a storage part 102, a communication part 104, a history information acquisition part 106, an evaluation processing part 108, a relative processing part 110, a display data generation part 112, an operation part 114, and a display part 116.

The information processing apparatus 100 may also have a control part (not shown) constituted by an MPU (Micro Processing Unit) or the like to perform various arithmetic processing using a control program or the like to control the whole information processing apparatus 100, a ROM (not shown) in which control data such as programs and arithmetic parameters used by the control part is recorded, and a RAM (not shown) used for primary storage of programs and the like executed by the control part. The information processing apparatus 100 connects each component, for example, by a bus used as a transmission path of data. The control part can also function as the history information acquisition part 106, the evaluation processing part 108, the relative processing part 110, or the display data generation part 112.

[Example of Hardware Configuration of Information Processing Apparatus 100]

Figure 33:
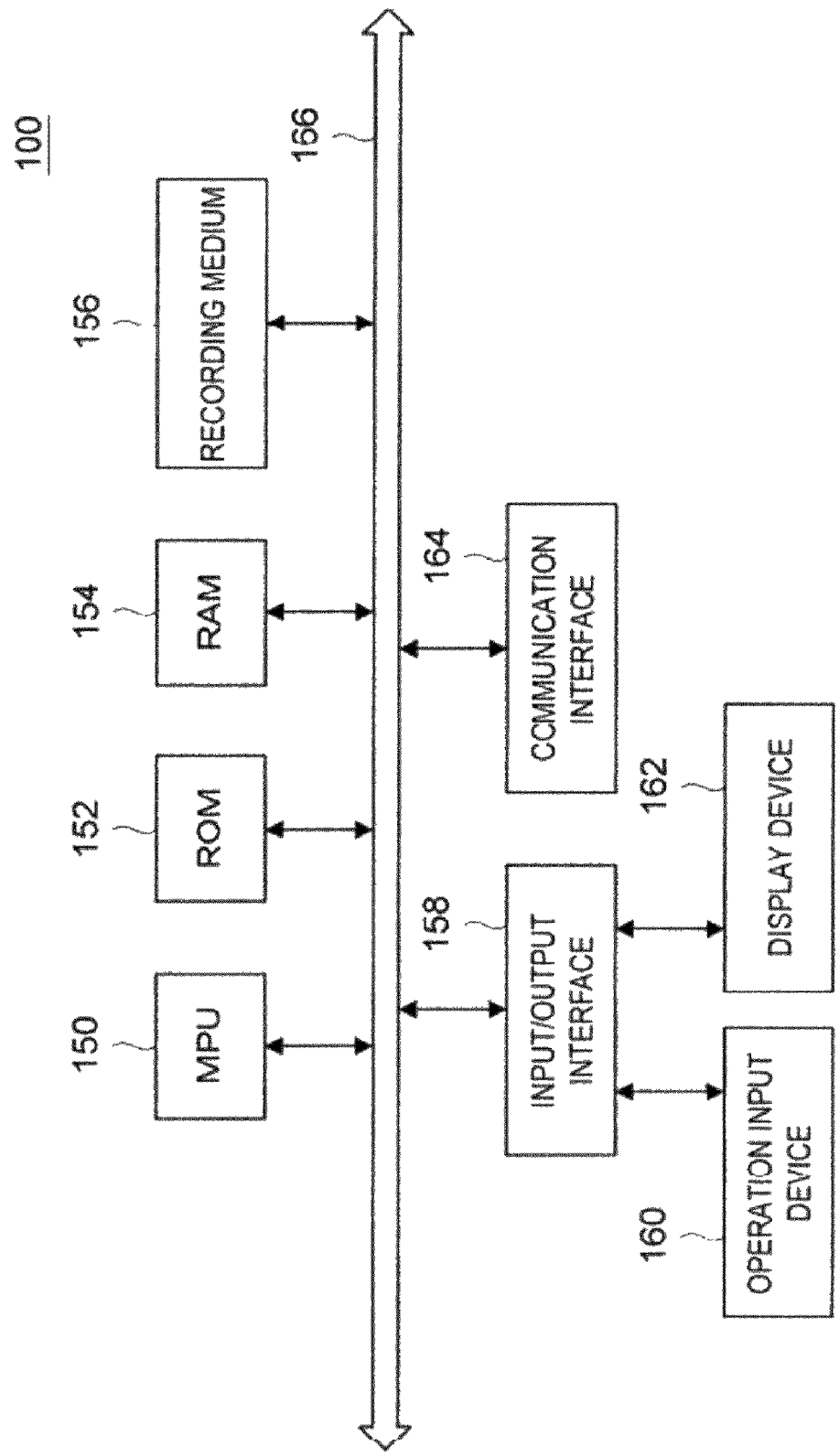
FIG. 33 is an explanatory diagram exemplifying a hardware configuration of the information processing apparatus according to an embodiment of the present invention.

FIG. 33 is an explanatory diagram exemplifying the hardware configuration of the information processing apparatus 100 according to an embodiment of the present invention. Referring to FIG. 33, the information processing apparatus 100 has, for example, an MPU 150, a ROM 152, a RAM 154, a recording medium 156, an input/output interface 158, an operation input device 160, a display device 162, and a communication interface 164. The information processing apparatus 100 connects each component, for example, by a bus 166 used as a transmission path of data.

The MPU 150 functions as a control part to control the whole information processing apparatus 100. The MPU 150 can also function as the history information acquisition part 106, the evaluation processing part 108, the relative processing part 110, or the display data generation part 112.

The ROM 152 stores control data such as programs and arithmetic parameters used by the MPU 150 and the RAM 154 is used for primary storage of programs and the like executed by the MPU 150.

The recording medium 156 functions as the storage part 102 of the information processing apparatus 100 and stores, for example, generated display data, history information corresponding to each user acquired from an external apparatus (not shown) or each display apparatus, image data to generate display data, and various applications. Here, the recording medium 156 includes a magnetic recording medium such as a hard disk and a nonvolatile memory such as an EEPROM, flash memory, MRAM (Magnetoresistive Random Access Memory), FeRAM (Ferroelectric Random Access Memory), and PRAM (Phase change Random Access Memory), but not limited to the above component.

The input/output interface 158 connects, for example, the operation input device 160 or the display device 162. Here, the input/output interface 158 includes, for example, a USB (Universal Serial Bus) terminal, DVI (Digital Visual Interface) terminal, and HDMI (High-Definition Multimedia Interface) terminal, but not limited to the above examples. The operation input device 160 is provided, for example, in the information processing apparatus 100 and connected to the input/output interface 158 inside the information processing apparatus 100. The operation input device 160 includes, for example, a rotating selector such as a button, direction key, and jog dial or a combination of these. The display device 162 is provided, for example, in the information processing apparatus 100 and connected to the input/output interface 158 inside the information processing apparatus 100. The display device 162 includes, for example, an LCD and organic EL display. The input/output interface 158 can naturally connect to an operation input device (for example, a keyboard or mouse) or a display device (for example, an external display apparatus) as an external apparatus of the information processing apparatus 100.

Moreover, the operation input device 160 functions as the operation part 114 and the display device 162 functions as the display part 116.

The communication interface 164 is an interface for performing communication with an external apparatus and functions as the communication part 104. Here, the communication interface 164 includes, for example, a LAN terminal, IEEE 802.11 port, and RF (Radio Frequency) circuit, but not limited to the above examples.

With the hardware configuration shown in FIG. 33, the information processing apparatus 100 can, for example, generate display data in accordance with a display request transmitted from a display apparatus and cause the display apparatus to display the generated display data by performing the processing in (1) and (2).

Each component of the information processing apparatus 100 will be described with reference to FIG. 32 again. The storage part 102 is a storage unit provided with the information processing apparatus 100. For example, history information corresponding to each user, image data to generate display data, and generated display data are stored in the storage part 102. FIG. 32 shows an example in which history information A140 corresponding to the user A, history information B142 corresponding to the user B, and history information C144 corresponding to the user C are stored in the storage part 102.

The communication part 104 performs communication with an external apparatus (not shown) or the display apparatuses 200, 300, 400, . . . , for example, via the network 500. More specifically, the communication part 104 transmits, for example, an acquisition request of history information to an external apparatus (not shown) or each display apparatus and receives history information transmitted from an external apparatus (not shown) or the like. The communication part 104 also receives, for example, a display request transmitted from each display apparatus and transmits display data in accordance with the display request to an origin display apparatus.

The history information acquisition part 106 periodically/non-periodically generates an acquisition request of history information to an external apparatus (not shown) or the display apparatuses 200, 300, 400, . . . and causes the communication part 104 to transmit the acquisition request of history information. Then, the history information acquisition part 106 receives history information received by the communication part 104 from the communication part 104. Then, the history information acquisition part 106 records the acquired history information in the storage part 102 for each user. Here, the history information acquisition part 106 can record the history information of each user in file format, but not limited to the above method and, for example, a portion thereof or all history information may be recorded in database format.

The evaluation processing part 108 reads history information corresponding to users whose display is requested by a display request from the storage part 102. Then, the evaluation processing part 108 performs evaluation processing in accordance with the evaluation theme indicated by the display request for each piece of read history information to derive evaluation index values corresponding to the user requested by the display request. That is, the evaluation processing part 108 plays a role of processing of "(1-1) Derivation of evaluation index values for each user" described above in the information processing apparatus 100.

The relative processing part 110 derives relative evaluation parameters showing relative relationships among users for each user based on evaluation index values for each user derived by the evaluation processing part 108. Here, the relative processing part 110 can derive relative evaluation parameters, for example, by selecting the derivation method in accordance with an evaluation theme based on the evaluation theme requested by the display request. That is, the relative processing part 110 plays a role of processing of "(1-2) Derivation of relative evaluation parameters showing relative relationships among users" described above in the information processing apparatus 100.

The display data generation part 112 generates an evaluation image showing relative relationships among users regarding the evaluation theme requested by the display request for each user based on relative evaluation parameters for each user derived by the relative processing part 110 to generate display data in which relative relationships among users are represented conforming to the evaluation theme requested by the display request. That is, the display data generation part 112 plays a role of processing of "(1-3) Generation of evaluation image" and "(1-4) Generation of display data" described above in the information processing apparatus 100.

The display data generation part 112 also transmits generated display data to an origin display apparatus of the display request to cause the origin display apparatus to display an image set by the display data. Here, the display data generation part 112 can transmit display data to the origin display apparatus of the display request, for example, based on device identification information such as the IP address or MAC address contained in the display request, but not limited to the above method. That is, the display data generation part 112 further plays a role of "(2) Transmission/display of display data" described above in the information processing apparatus 100.

Further, the display data generation part 112 can store the generated display data in the storage part 102.

The operation part 114 is an operation unit of the information processing apparatus 100 enabling the user (administration user) of the information processing apparatus 100 to perform predetermined operations. With the operation part 114 being provided with the information processing apparatus 100, the administration user can cause the information processing apparatus 100 to perform desired operations such as selectively acquiring history information of a specific user from a predetermined external apparatus (not shown) or display apparatus. Here, the operation part 114 includes, for example, an operation input device such as a keyboard and mouse, a rotating selector such as a button, direction key, and jog dial, or a combination of these, but not limited to the above examples. The operation part 114 can also be made a part integrated with the display part 116 such as a touch screen.

The display part 116 is a display unit provided with the information processing apparatus 100 and displays, for example, display data generated by the display data generation part 112 and various screens such as an operation screen of operations by the operation part 114 caused by the control part (not shown) to display. Here, the display part 116 includes, for example, an LCD and organic EL display, but not limited to the above examples.

The information processing apparatus 100 can perform, with, for example, the storage part 102, the communication part 104, the history information acquisition part 106, the evaluation processing part 108, the relative processing part 110, the display data generation part 112, the operation part 114, and the display part 116 being provided with the information processing apparatus 100, processing of (1) Generation of display data (more specifically, (1-1) Derivation of evaluation index values for each user, (1-2) Derivation of relative evaluation parameters showing relative relationships among users, (1-3) Generation of evaluation image and (1-4) Generation of display data) and (2) Transmission/display of display data described above. Therefore, the information processing apparatus 100 can generate display data in accordance with a display request transmitted, for example, from a display apparatus as an external apparatus to cause the display apparatus to display the generated display data.

The information processing apparatus 100 can cause an unspecified number of people to share relative information among a plurality of users based on history information via display data showing an image in which relative information among the plurality of users based on history information is indirectly represented by performing the processing of (1) Generation of display data and (2) Transmission/display of display data described above. Therefore, the information processing apparatus 100 can cause an unspecified number of people to share relative information among the plurality of users based on history information while keeping users' privacy.

The information providing system 1000 according to an embodiment of the present invention has, as described above, the display apparatuses 200, 300, 400, ... and the information processing apparatus 100. Each of the display apparatuses 200, 300, 400, ... transmits a display request to the information processing apparatus 100 and displays an image showing display data after receiving the display data transmitted from the information processing apparatus 100 in accordance with the display request.

The information processing apparatus 100 also generates display data in accordance with a display request transmitted from each display apparatus to cause the display apparatus to display the generated display data by performing the processing of (1) Generation of display data and (2) Transmission/display of display data.

Here, the information processing apparatus 100 can represent relative relationships of information about each user in accordance with each evaluation theme indirectly by using visual information, that is, images, instead of values themselves of relative evaluation parameters derived based on history information by performing the processing of (1-1) Derivation of evaluation index values for each user, (1-2) Derivation of relative evaluation parameters showing relative relationships among users, (1-3) Generation of evaluation image and (1-4) Generation of display data.

The information processing apparatus 100 also transmits generated display data to an origin display apparatus of the display request to cause the display apparatus to display an image set by the display data by performing the processing of (2) Transmission/display of display data. Therefore, the information processing apparatus 100 can provide relative information among a plurality of users based on history information to an unspecified number of people while keeping users' privacy.

Therefore, the information providing system 1000 according to an embodiment of the present invention can cause an unspecified number of people to share relative information among a plurality of users based on history information while keeping users' privacy.

The information providing system 1000 can also assist in formation of communities that join users reflecting life, hobbies, and interests in real society by causing an unspecified number of people to share relative information among a plurality of users based on history information.

In the foregoing, the display apparatuses 200, 300, 400, ... are used as components constituting the information providing system according to an embodiment of the present invention for a description of an embodiment, an embodiment of the present invention is not limited to such a form and, for example, can be applied to various display apparatuses such as CRT (Cathode Ray Tube) displays, organic EL displays, and LCD, receiving devices for receiving TV broadcasting, mobile communication devices such as mobiles phones, computers such as PCs (Personal Computers), and mobile game machines such as PlayStation Portable (registered trademark).

The information processing apparatus 100 is used as a component constituting the information providing system according to an embodiment of the present invention for a description of an embodiment, an embodiment of the present invention is not limited to such a form and, for example, can be applied to computers such as PCs, UMPC (Ultra Mobile Personal Computer), and servers, mobile communication devices such as mobiles phones, mobile game machines such as PlayStation Portable (registered trademark), and game machines such as PlayStation (registered trademark) series.

(Program According to an Embodiment of the Present Invention)

An unspecified number of people can be caused to share relative information among a plurality of users based on history information while keeping users' privacy by a program causing a computer to function as the information processing apparatus 100 according to an embodiment of the present invention.

(Display Data Providing Method)

Figure 34:
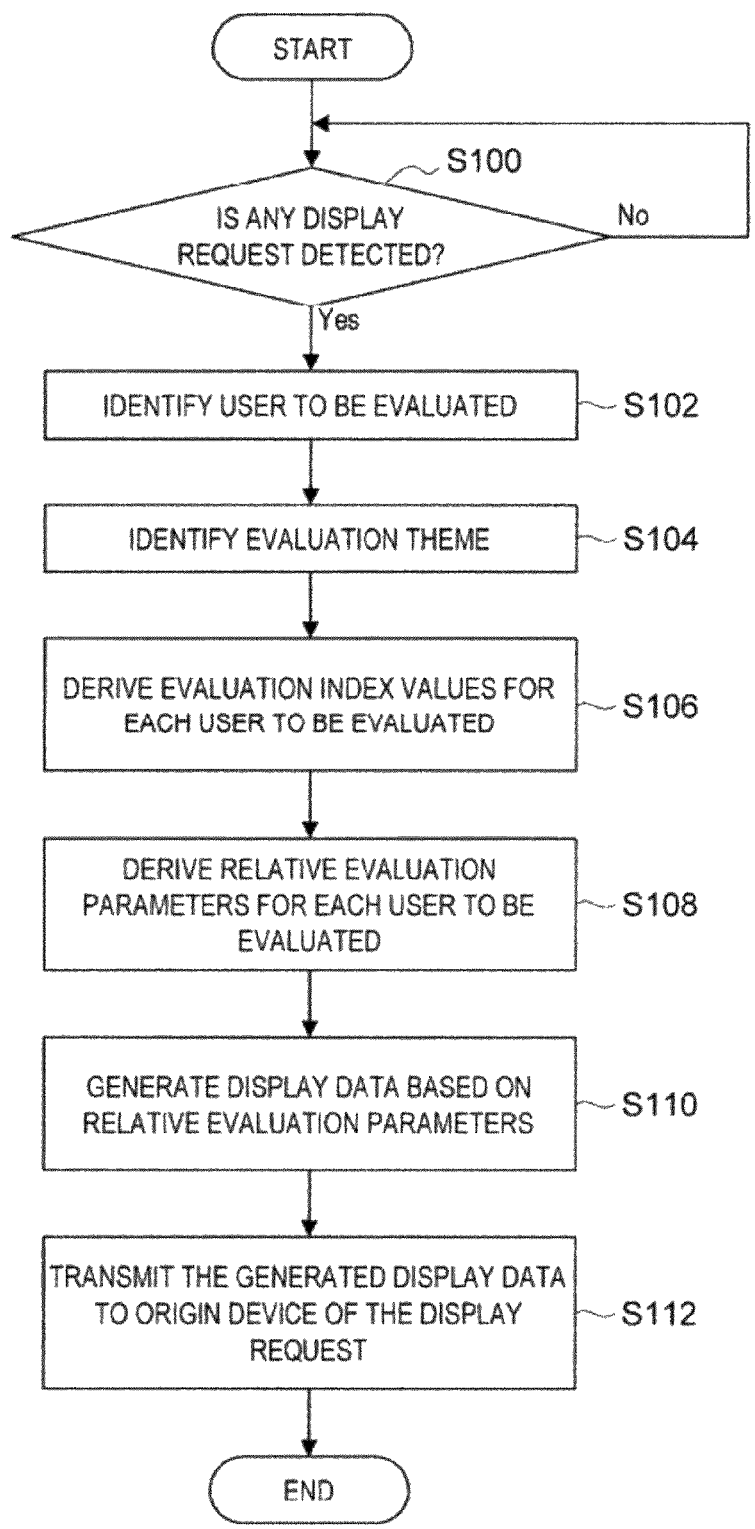
FIG. 34 is a flow chart exemplifying a display data providing method according to an embodiment of the present invention.

Next, the display data providing method according to an embodiment of the present invention will be described. FIG. 34 is a flow chart exemplifying the display data providing method according to an embodiment of the present invention.

The information processing apparatus 100 determines whether or not a display request is detected (whether the communication part 104 has received a display request) (S100). If not determined that a display request is detected at step S100, the information processing apparatus 100 does not go on with processing.

If determined that a display request is detected at step S100, the information processing apparatus 100 identifies users to be evaluated (target for generating display data) (S102) and also identifies the evaluation theme (S104). Here, the information processing apparatus 100 can identify users for whom display data will be generated based on, for example, user IDs held by the display request, but not limited to the above method. The information processing apparatus 100 can also identify the evaluation theme based on, for example, information about the evaluation theme held by the display request.

After users to be evaluated are determined at steps S102 and S104, the information processing apparatus 100 derives evaluation index values in accordance with the identified evaluation theme for each of the identified users to be evaluated (S106). Here, the information processing apparatus 100 can derive evaluation index values by using history information corresponding to each identified user. Incidentally, the information processing apparatus 100 is not limited to deriving evaluation index values corresponding to users to be evaluated identified at step S102 and, for example, can derive evaluation index values corresponding to any number of users whose history information is stored in the storage part 102.

After evaluation index values for each identified user to be evaluated are derived at step S106, the information processing apparatus 100 derives relative evaluation parameters in accordance with the evaluation theme identified at step S104 (S108). Then, the information processing apparatus 100 generates display data based on relative evaluation parameters derived at step S108 (S110). Here, the information processing apparatus 100 generates display data, for example, by generating an evaluation image for each user to be evaluated based on relative evaluation parameters and combining (grouping) each generated evaluation image, or combining each generated evaluation image and an additional image, but not limited to the above methods.

After display data is generated at step S110, the information processing apparatus 100 transmits the generated display data to an origin device of the display request to cause the device to display an image set by the display data (S112). Here, the information processing apparatus 100 can transmit the display data to the origin device of the display request by identifying the origin device of the display request based on, for example, device identification information such as the MAC address or IP address contained in the display request, but not limited to the above method.

By using the display data providing method shown in FIG. 34, the information processing apparatus 100 can perform the processing of (1) Generation of display data and (2) Transmission/display of display data. Therefore, the information processing apparatus 100 using the display data providing method shown in FIG. 34 can cause an unspecified number of people to share relative information among a plurality of users based on history information while keeping users' privacy.

It should be understood by those skilled in the art that various modifications, combinations, sub-combinations and alterations may occur depending on design requirements and other factors insofar as they are within the scope of the appended claims or the equivalents thereof.

In the information providing system 1000 shown in FIG. 32, for example, a constitution in which the information processing apparatus 100 and each of the display apparatuses 200, 300, 400, . . . perform communication via the network 500 is shown, but not limited to the above constitution. For example, an information processing apparatus according to an embodiment of the present invention and each of the display apparatuses can perform communication directly using infrared communication or IEEE 802.11. Even with the above constitution, an information processing apparatus according to an embodiment of the present invention can generate display data in accordance with a display request transmitted from a display apparatus to cause the display apparatus to display an image set by the display data. Therefore, even with the above constitution, an information processing apparatus according to an embodiment of the present invention can cause an unspecified number of people to share relative information among a plurality of users based on history information while keeping users' privacy.

Also, in the information providing system 1000 shown in FIG. 32, a constitution in which the information processing apparatus 100 generates display data based on a display request and transmits the display data to an origin display apparatus of the display request is shown, but not limited to the above constitution. For example, in an information providing system according to an embodiment of the present invention, an information processing apparatus according to an embodiment of the present invention derives relative evaluation parameters based on a display request and transmits the relative evaluation parameters to an origin display apparatus of the display request. Then, with display data being generated on the side of the display apparatus that received the relative evaluation parameters, relative relationships of information about each user in accordance with the evaluation theme can be represented by images. Even with the above constitution, relative relationships of information about each user in accordance with the evaluation theme indirectly by using visual information, that is, images, instead of values themselves of relative evaluation parameters derived based on history information. Therefore, an information providing system having the above constitution can achieve the same effect as that of the information providing system 1000 shown in FIG. 32.

The above constitution shows an example of an embodiment of the present invention and naturally belongs to the technical scope of the present invention.

What is claimed is:

1. An information processing apparatus capable of communicating with a display apparatus displaying an image, comprising:
   a storage part storing, user by user, history information showing a user state chronologically;
   an evaluation processing part deriving, user by user, an evaluation index value corresponding to an evaluation theme requested in a display request transmitted from the display apparatus, by performing a process according to the evaluation theme for each piece of history information of at least two users who are requested to be displayed in the display request, based on the display request;
   a relative processing part deriving, user by user, a relative evaluation parameter showing a relationship between the users in the evaluation theme based on the evaluation index value derived, user by user, by the evaluation processing part; and
   a display data generation part generating display data which shows an evaluation image of each user showing the relationship between the users in the evaluation theme, by generating, user by user, the evaluation image based on the relative evaluation parameter derived, user by user, by the relative processing part.

2. The information processing apparatus according to claim 1, wherein the evaluation processing part further derives the evaluation index value for a user other than the users who are requested to be displayed in the display request, using the history information stored in the storage part, and
   the relative processing part derives the relative evaluation parameter for the users who are requested to be displayed in the display request, based on the evaluation index value derived by the evaluation processing part.

3. The information processing apparatus according to claim 1, wherein the display data generation part generates display data in which the evaluation image of each user is shown to be grouped.

4. A display data providing method that can be used in an information processing apparatus, the information processing apparatus including a communication part communicating with a display apparatus displaying an image and a storage part storing, user by user, history information showing user states chronologically, the method comprising:
   a first derivation step of deriving, user by user, an evaluation index value corresponding to an evaluation theme requested in a display request transmitted from the display apparatus, by performing a process according to the evaluation theme for each piece of history information of at least two users who are requested to be displayed in the display request, upon receiving a reception of the display request;
   a second derivation step of deriving, user by user, a relative evaluation parameter showing a relationship between the users in the evaluation theme based on the evaluation index value derived user by user in the first derivation step;
   a generation step of generating display data which shows an evaluation image of each user showing the relationship between the users in the evaluation theme, by generating, user by user, the evaluation image based on the relative evaluation parameter derived user by user in the second derivation step; and
   a transmission step of transmitting the display data generated in the generation step to a display device that transmitted the display request.

5. At least one recording medium having encoded thereon processor-executable instructions that, when executed by at least one processor, cause the processor to carry out a method for use in an information processing apparatus, the information processing apparatus including a communication part communing with a display device displaying an image and a storage part storing, user by user, history information showing a user state chronologically, the method comprising:
   a first derivation step of deriving, user by user, an evaluation index value corresponding to an evaluation theme requested in a display request transmitted from the display apparatus, by performing a process according to the evaluation theme for each piece of history information of at least two users who are requested to be displayed in the display request, upon receiving a reception of the display request;

a second derivation step of deriving, user by user, a relative evaluation parameter showing a relationship between the users in the evaluation theme based on the evaluation index value derived user by user in the first derivation step;

a generation step of generating display data which shows an evaluation image of each user showing the relationship between the users in the evaluation theme, by generating, user by user, the evaluation image based on the relative evaluation parameter derived user by user in the second derivation step; and a transmission step of transmitting the display data generated in the generation step to a display device that have transmitted the display request.

* * * * *